United States Patent
Chandwani et al.

(10) Patent No.: US 12,387,131 B2
(45) Date of Patent: Aug. 12, 2025

(54) ENHANCED PIPELINE FOR THE GENERATION, VALIDATION, AND DEPLOYMENT OF MACHINE-BASED PREDICTIVE MODELS

(71) Applicant: MICROSOFT TECHNOLOGY LICENSING, LLC, Redmond, WA (US)

(72) Inventors: Santosh Chandwani, Redmond, WA (US); Ameet Vijay Joshi, Redmond, WA (US); Amit Martu Kamat, Sammamish, WA (US); Raveendmathan Loganathan, Sammamish, WA (US); Veera Venkata Stya Sridhar Maddipati, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1382 days.

(21) Appl. No.: 15/994,964

(22) Filed: May 31, 2018

(65) Prior Publication Data
US 2019/0370695 A1  Dec. 5, 2019

(51) Int. Cl.
*G06F 16/28* (2019.01)
*G06F 18/21* (2023.01)
(Continued)

(52) U.S. Cl.
CPC .......... *G06N 20/00* (2019.01); *G06F 16/288* (2019.01); *G06F 18/214* (2023.01);
(Continued)

(58) Field of Classification Search
CPC ...... G06N 20/00; G06N 7/005; G06N 3/0445; G06N 3/0454; G06F 16/288; G06K 9/6256; G06K 9/6262; G06K 9/6267
(Continued)

(56) References Cited

U.S. PATENT DOCUMENTS 7,480,640 B1  1/2009  Elad et al.
7,933,762 B2  4/2011  Pinto et al.
(Continued)

OTHER PUBLICATIONS

"AutoML: Automatic Machine Learning", Retrieved from: http://h2o-release.s3.amazonaws.com/h2o/rel-vapnik/1/docs-website/h2o-docs/automl.html, Retrieved Date: Mar. 28, 2018, 8 Pages.
(Continued)

*Primary Examiner* — Hung T Vy
(74) *Attorney, Agent, or Firm* — Shook, Hardy & Bacon L.L.P.

(57) ABSTRACT

An enhanced pipeline for the generation, validation, and deployment of machine-based predictive models (PMs) is provided. The pipeline analyzes records to generate a graph that indicates various relationships between the records. A user provides a selection of a data element of interest (DEOI). The generated PM predicts values for the DEOI based on input records that do not include values for the DEOI. The user provides selections for values of the DEOI that represent positive outcomes associated with the DEOI. The user provides selections for values of the DEOI that represent negative outcomes associated with the DEOI. A subgraph of the graph is determined based on the DEOI. A relevant set of records is determined based on the subgraph. The PM is automatically trained, validated, and deployed based on the relevant set of records, the DEOI, and the representative values for the DEOI.

20 Claims, 12 Drawing Sheets

(51) Int. Cl.
*G06F 18/214* (2023.01)
*G06F 18/24* (2023.01)
*G06N 7/01* (2023.01)
*G06N 20/00* (2019.01)

(52) U.S. Cl.
CPC ............ *G06F 18/217* (2023.01); *G06F 18/24* (2023.01); *G06N 7/01* (2023.01)

(58) Field of Classification Search
USPC ........................................................ 707/758
See application file for complete search history.

(56) References Cited

U.S. PATENT DOCUMENTS

| | | | | |
|---|---|---|---|---|
| 10,713,594 | B2* | 7/2020 | Szeto | G06N 20/00 |
| 2016/0071017 | A1* | 3/2016 | Adjaoute | G06Q 20/4016 |
| | | | | 706/52 |
| 2016/0162779 | A1* | 6/2016 | Marcus | G06N 20/10 |
| | | | | 706/12 |
| 2017/0220943 | A1* | 8/2017 | Duncan | G06N 5/04 |
| 2017/0329869 | A1* | 11/2017 | Lindsley | G06N 20/00 |
| 2018/0046926 | A1* | 2/2018 | Achin | G06F 9/5011 |
| 2018/0075175 | A1 | 3/2018 | Chang et al. | |
| 2018/0081912 | A1* | 3/2018 | Suleiman | G06F 16/215 |
| 2018/0082183 | A1* | 3/2018 | Hertz | G06Q 10/10 |
| 2018/0232659 | A1* | 8/2018 | Ranatunga | G06Q 30/0241 |

OTHER PUBLICATIONS

"Dynamic Machine Learning Using the KBpedia Knowledge Graph", Retrieved from: http://kbpedia.com/use-cases/dynamic-machine-learning/, Retrieved Date: Mar. 28, 2018, 41 Pages.

Astala, et al., "Score Model", Retrieved from: https://docs.microsoft.com/en-us/azure/machine-learning/studio-module-reference/score-model, Jan. 24, 2018, 5 Pages.

Atzmueller, et al., "Mixed-Initiative Feature Engineering Using Knowledge Graphs", In Proceedings of the Knowledge Capture Conference, Dec. 4, 2017, 4 Pages.

Cheng, et al., "Automated Feature Generation from Structured Knowledge", In Proceedings of the 20th ACM international conference on Information and knowledge management, Oct. 24, 2011, 10 Pages.

Grainger, et al., "The Semantic Knowledge Graph: A compact, auto-generated model for real-time traversal and ranking of any relationship within a domain", In Journal of Computing Research Repository, Sep. 2016, 10 Pages.

\* cited by examiner

ENHANCED PIPELINE FOR THE GENERATION, VALIDATION, AND DEPLOYMENT OF MACHINE-BASED PREDICTIVE MODELS

BACKGROUND

Computing machines are now ubiquitous. The widespread use of such machines generates staggering amounts of information (i.e., machine data) on a daily basis. For example, the barrage of mouse clicks and keyboards strokes of users visiting global e-commerce, media streaming, crowd-sourcing, and social network platforms continually generates significant volumes of machine data. Such automatically generated machine data encodes user selections, preferences, responses, and other user actions. In an attempt to forecast or anticipate future user selections, preferences, responses, and events, as well as forecast market performances, consumer trends, heard behavior, and other traditionally difficult-to-predict phenomena, data scientists and other highly trained professionals are increasingly deploying machine learning (ML) models, or other predictive models (PMs) on the surging volumes of available data.

Via training techniques, ML models determine (or "learn") trends, associations, couplings, and other correspondences "hidden" within data sets (e.g., training data). Generally, ML models employ sophisticated and highly-dimensional statistical techniques on large sets of training data. Many ML models determine correlations, covariances, mappings, embeddings, distances, and other statistical measurements and/or metrics associated with highly-dimensional variables or features encoded in the training data. Many such features may be "hidden" or "latent" features within the training data. Some ML models may determine values that parameterize highly-dimensional statistical distributions defined via the training data. Based on the determination of such statistical measurements, metrics, and/or parameters, data scientists may make at least probabilistic-based predictions or forecasts regarding currently un-observed data, e.g., future user behavior.

Because of the growing availability of computational, memory, and informational resources, data scientists are increasing the complexity and dimensionality of ML models. For example, it is now common for deep learning (DL) models to include thousands, or even tens of thousands, of dimensions in the feature spaces of the models. The increasing complexity of the models, volumes of available data, and computational resources is rendering many natural and manmade phenomena, which were once thought to be unpredictable, now within the realm of predictability, at least in a probabilistic-sense. However, due to the complexity of the models and the need for sophisticated selection and/or processing of the training and validation data sets, the deployment of such conventional ML models is relegated to data scientists and other highly trained professionals. Because of the limited availability of such sophisticated professionals, the deployment of ML models towards many potentially predictable phenomena goes unmet.

Furthermore, data scientists must provide many customization steps for the generation, validation, and deployment of ML models for each new predictive task. Such customizations may require subjective judgment from the data scientist or other trained specialists. Because of the requirement of a data scientist, the application of ML models for many predictive tasks is out of reach. Furthermore, the compounding-nature of the subjective judgments required at each customization step renders the predictive performance of a ML compromised. For example, each non-optimal judgment introduced into the process may compound to generate significant inaccuracies in a ML model.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects of this disclosure relate to computerized systems for enhanced pipelines for the generation, validation, and deployment of machine-based enhanced predictive models (PMs). The various embodiments provide an enhanced pipeline or workflow that generates, validates, and deploys enhanced PMs, such as ML models. The operation of the enhanced pipeline does not require the subjective judgments and attention of highly trained specialists. Accordingly, the embodiments do not include compounding non-optimal judgements and provide more accurate PMs than conventional systems. When the accuracy of an enhanced PM is sensitive to a selection (e.g., the selection of values for hyper-parameters of the PM), the various embodiments iterate over possible selections to determine the best selection (i.e., the selection that generates the most accurate PM) via a model validation process. Furthermore, the enhanced pipeline may be applied to any general predictive task. Thus, the embodiments enable the deployment of more accurate PMs to a much larger array of predictive tasks than is possible via conventional systems.

Various embodiments include methods and systems that are enabled to receive a corpus of records. The records encode values for various data elements (DEs). The records are analyzed to determine and/or infer various relationships between the records. A graph representing the relationships may be generated. The nodes of the graph may indicate the records and the (directed or undirected) nodes of the graph indicate the relationships between the records. A user may provide a selection of a DE of interest (DEOI), where the PM will be trained to predict values for the DEOI based on input records that do not include values for the DEOI. The user may provide selections for values of the DEOI that represents or corresponds to a binary outcome or multi-valued outcome associated with the DEOI. The selections for values of the DEOI provided by the user may represent or correspond to a positive value or a negative value for a binary outcome, or a set of values for multi-valued outcomes, associated with the DEOI. A relevant set of records may be determined (with or without manual review), based on the determined or inferred relationships between the records and the DEOI. To determine the relevant set of records, the relationship graph may be traversed. The traversal of the graph enables the determination of the relevant set of records via the generation of a sub-graph. The nodes of the sub-graph are associated with the records of the relevant set of records. Each record in this relevant set either includes a value for the DEOI or is directly and/or indirectly related to a record within the set that includes a value for the DEOI. The PM is trained, validated, and deployed based on this relevant set of records, the DEOI, and the representative values for the DEOI.

BRIEF DESCRIPTION OF THE DRAWINGS

Aspects of the disclosure are described in detail below with reference to the attached drawing figures, wherein.

DETAILED DESCRIPTION

Figure 1:
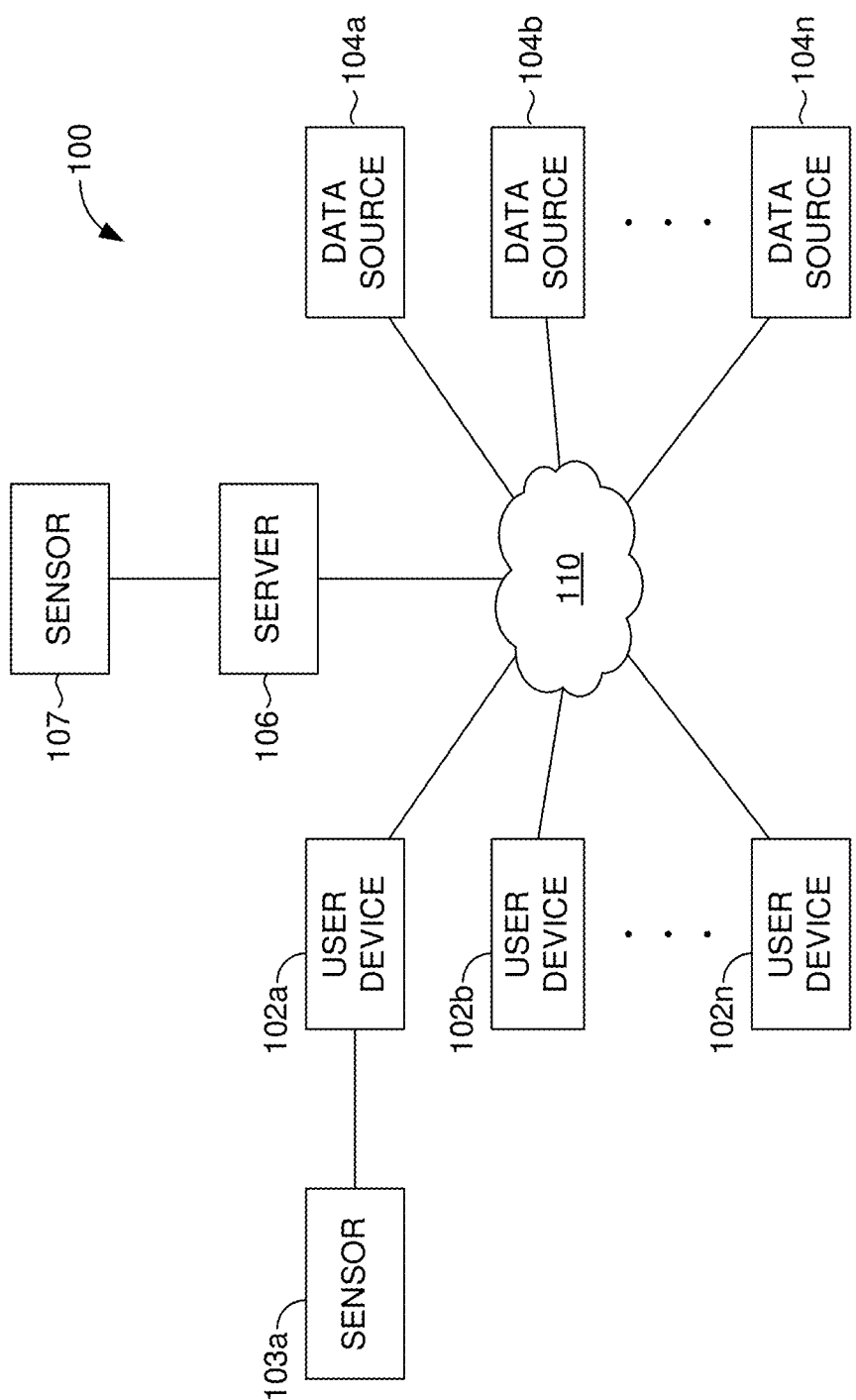
FIG. 1 is a block diagram of an exemplary computing environment suitable for use in implementing embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As used herein, the term "set" may refer to a collection of objects and/or elements. A set may include n objects, where n is a non-negative integer, i.e., n=0, 1, 2, 3, . . . . That is, n is a non-negative integer with a lower bound of 0 and no upper bound. Accordingly, a set collection may include no elements, i.e., a set herein may be a null set and/or an empty set. Articles such as "a", "an," and "the" may encompass a plurality, i.e., these articles may be inferred to be read as "one or more" or "at least one," and the like.

As used herein, the term "value" may refer to a discrete unit or quantity of information. A value may be a numerical value (e.g., a real number, such as an integer or rational number, an imaginary number, or the like), a string value (e.g., "string value"), a Boolean (or binary) value, an index, or virtually any information encoded in structured or unstructured data. A value may be a scalar value, a vector value, a tensor value, an n-gram, an array value, a (linked or unlinked) list value, or the like. A value may be encoded in various data type, such as but not limited to real, double, float, long, char, string, boolean, or the like. The terms "data element" and "DE" may be used interchangeably to refer to a discrete unit of data that encodes a value. In various embodiments, a DE included in a record may include an attribute of the record. In one non-limiting example, a DE may include a field-value pair. A field-value pair may include a field and a value. A field may be indicated via a field label. Similarly, DE may include a key-value pair. A DE may be characterized as a DE type. In various embodiments, a DE type may be similar to a field label. In some embodiments, a DE type may be based on a data type of the value encoded in the DE, e.g., integer, long, double, float, char, string, or the like. A DE may include or encode a value of various value types. For example, a DE may include two values: one integer and one string. A DE may include an array or (linked or unlinked) list of a value and/or value types.

As used herein, the term "record" refers to any structured or unstructured data that includes a data element. Thus, a record encodes a value. A record may include DEs of a DE type. Non-limiting examples of records include business records, medical records, electronic communications (e.g., e-mail messages, chat logs, social network postings), websites, web or blog postings, user contact information, transaction (e.g., sales) records, marketing lists and/or programs, logs of online activity, logs of communication network traffic, financial records, a database entry, document, or any other such machine data. As discussed throughout, the term "record type" (or "type of record") may be used to discuss a type or classification of a record, e.g., a sales record, customer contact record, or the like. In contrast, a record may be referred to a specific instance of a record type. The distinctions between an instance of a DE and a DE type may be similarly discussed throughout. For example, a record may include a DE type. For each of DE type included in a record, an instance of the DE type may be included in the record. Accordingly, a record may include an array or (linked or unlinked) list of a DE and/or DE types.

Via a DE, a record may encode information regarding an entity, such as but not limited to a business entity. For example, the number of employees, the type of products and/or services, contact information, and the like may be encoded within a DE of a record. Similarly, various information regarding an employee or a customer may be encoded in a record. A record may encode details of interactions or engagements between agents of an entity and others, i.e., how many times an employee of the entity interacted with a particular customer, the nature of the interactions, and the outcomes of the interactions. A record may encode various information or data regarding marketing related programs, campaigns, activities, and lists of the entity. Records may encode information pertaining to customer contact lists, communications with customers (emails, video/audio/textual-based chat logs, SMS, or other such electronic communication means), websites and/or web sessions. Records may encode the categories, classifications, semantics, sentiments, or other contextual information regarding the nature of a communication. Records may encode an employer, or a potential employer, of an individual, such as an actual or a potential customer.

Any of the data or information encoded within a record may be statistical in nature, in that the information is not deterministic. For example, a DE included in a record may indicate a likelihood (frequentists) or belief (Bayesian) of the accuracy of information encoded in the DEs. A record may include a statistical confidence level for the encoded information. For example, there is a 78% confidence that Individual_A works for Company_B. The data or information of a record may be distributed within, or encoded within, a data file.

The terms "corpus of records," "record corpus," or "corpus" are used interchangeably to refer to a collection or set of a record. Thus, a corpus of records may include a plurality of records. A corpus of records may include records of a record type. For each included record type, a corpus may include an instance of a record type. Thus, a corpus may include an array or (linked or unlinked) list of records and/or record types. In non-limiting examples, a corpus of records may include a set or sub-set of business records. For instance, a corpus may include various sales transaction records, marketing records, customer contact records, web session records, website records, activity records, message records, and the like.

As used herein, the terms "predictive model" and "PM" are used interchangeably to refer to any machine-based and/or machine-implemented model that receives an input record (or a DE) and generates a predicted output values based on the input record (or the DEs). In some embodiments, the output of a PM may include a predicted recors and/or a DE that encode an output value. A PM's output values may include numerical values, classification values (e.g., an index value), string values, distributions of numerical/classification/string values, or any combination thereof. More particularly, a PM determines, generates, or predicts a value of a DE based on a value of a DE included in the input record. A DE, or DE type, that a PM predicts a value for is referred to as a "data element of interest," or a "DEOI." In various embodiments, a DEOI is the outcome that is to be predicted via the PM. As noted above, a DE may be an attribute of a record. Thus, a POM may predict various outcomes of an attribute.

In some embodiments, an instance of the DE type of the DEOI may be included in the input record. An input record for a PM may be an incomplete record that does not include a value for the DEOI. For example, the input record for a first PM may include a record of a sales transaction, where the sales transaction record does not include a value for a DE type of "customer ID," and the value of the DE "customer ID" indicates the customer for the sale encoded in the sale record. The first PM may predict a value for the missing DE of "customer ID" based on the value of the other DE of the input record. That is, the DEOI for the first PM is "customer ID." In other embodiments, a DE type of the DEOI for a particular PM may not be included in the input record. For example, a second PM may predict a value for a DEOI of DE type "next quarter's sales," where the value "next quarter's sales" indicates a prediction for the total volume of sales for the next quarter. The second PM may receive, as input records, the current sales records for the current quarter. Based on the values of the DEs of the records for the current quarter's sales, the second PM predicts a value for the DEOI "next quarter's sales." In still another embodiment, a PM may be trained to predicted a product a customer is likely to buy. For example, input records associated with a customer may include information regarding preferences of a customer. A PM may be trained to infer various products and/or services a customer would likely purchase, if the products and/or services were recommended to the customer.

In some embodiments, a PM model predicts or forecasts values for a DEOI associated with future events or conditions based on a record that encode values for DEs and DEOIs associated with previous events or conditions. For example, in one embodiment, a PM receives a record that indicate previous sales metrics. The PM generates an output value for DEOIs that indicate predicted future sales metrics. In some embodiments, a PM may automatically recognize, identify, and/or classify a feature associated with an input record based on the value encoded in the record. For instance, a PM may receive a record that include image data. The PM may recognize, identify, and/or classify persons or objects depicted in the image data. In the various embodiments, a PM may infer and/or determine semantic features of input records. For example, a PM may receive a record of current news events. The PM may determine the semantics of the current news records. A PM may label features associated with input records. For example, a PM may receive an e-mail record from a particular user. The PM may label the user as a likely customer based on the input e-mail records.

In some embodiments, a generated output value is a deterministic value. In other embodiments, a generated value may be a probabilistic value, e.g., a value with an associated probability, confidence interval, frequentist or Bayesian likelihood, or the like. For instance, a PM may generate a statistical distribution for each output value. A statistical distribution may be a parameterized distribution. The output values may include an associated probability, likelihood, confidence interval, a confidence level, or the like.

In an embodiment, a PM may be a deterministic and/or probabilistic function. That is, a PM may be a deterministic or a probabilistic mapping from a value of an input variable (encoded in a DE or record) to a value of an output variable. The values of the input variable may be included in an input record. Predictive tasks or applications for a PM includes, but is not limited to machine vision, natural language processing (NLP), object recognition and/or classification, data clustering, business outcome predictions, or any other such prediction.

In some non-limiting embodiments, a PM includes a machine learning (ML) model. ML models may include supervised and/or unsupervised ML models. Such ML models may include a model type, such as but not limited to linear regression models, logistic regression models (e.g., classifiers), (directed or undirected) graph models, clustering models, Bayesian networks, decision tree models, support vector machine models, mixture models, expectation maximization (EM) models, Markov models, Monte Carlo models, reinforcement learning models, and the like. In non-limiting embodiments, such models may be implemented on a neural network, such as but not limited to feed forward neural networks, recurrent neural networks (RNN), long/short term memory (LSTM) neural networks, convolutional networks, deconvolutional networks, and the like. Any of the various neural networks may be a deep or shallow network.

Briefly, the various embodiments herein address limitations associated with conventional machine learning (ML) and/or predictive systems and/or platforms, as well as provide various improvements to the performance of, and benefits to the users of, predictive computational systems. As discussed throughout, conventional ML systems require significant manual customization for each new predictive task. In contrast to conventional ML systems, the various embodiments herein provide enhanced predictive computing systems that are enabled to generate predictive models (PM) for virtually any predictive task, with little or no manual customization from a user. That is, the embodiments include generalized PM systems that generate PMs for a variety of predictive tasks, without requiring significant guidance and expertise of a user. As discussed throughout, such embodiments enable the application of better performing PMs (i.e., more accurate predictions) to a significantly increased array of predictive tasks, as compared to what is possible with conventional ML and/or predictive systems.

More specifically, the operation of conventional ML systems and/or platforms, which generate trained ML models, requires the expertise, attention, and subjective judgment of highly trained and skilled professionals, such as data scientists. For example, to conventionally generate a trained ML model for a specific predictive task, a data scientist is required to perform many manually intensive and subjective customizations. Such subjective customizations are based on the context of the ML model, the training data, and the specific application of the ML model. The generation of a single conventional ML model may require data scientists to manually select, process, and combine (or join together) large volumes of training and validation data related to the historical observed outcome data, as well as manually curate significant features within the training and validation data (e.g., selection of relevant signals within the training data). For the generation of a conventional ML model, the data scientist is further required to manually customize the ML model type (e.g., support vector machine model or Markov chain model) and customize model implementations (e.g., convolutional neural network (CNN) or recurrent neural). Customizing the model implementation may include subjective judgments regarding selecting the number of network layers, selecting the number of channels per layer, and the like. The data scientist is also required to estimate values of model's hyper-parameters. That is, manual intervention and customization is required in the training, validation, and deployment of the conventional ML models.

Each of these tasks requires the subjective judgement of highly trained specialists based on the context of the available training data and specific predictive task. Because of the requirement of highly trained specialists, the application of conventional ML systems for many predictive tasks is not scalable for many predictive tasks, at least because there are not enough trained specialists to perform these tasks for every task that may be predictable via an ML model. Furthermore, the compounding-nature of the subjective judgments required at each customization step renders the predictive performance of conventional ML systems compromised. For example, each non-optimal judgment introduced into the process may compound supra-linearly with other non-optimal judgments to generate significant inaccuracies in a conventional ML model.

The various embodiments address these concerns by providing an enhanced pipeline or workflow generates, validates, and deploys enhanced predictive models (PM), such as ML models. The operation of the enhanced pipeline does not require the subjective judgments and attention of highly trained specialists. Accordingly, the embodiments do not include compounding non-optimal judgements and provide more accurate PMs than conventional systems. When the accuracy of a PM is sensitive to a selection (e.g., the selection of values for hyper-parameters of the PM), the various embodiments iterate over possible selections to determine the best selection (i.e., the selection that generates the most accurate PM) via a model validation process. Furthermore, the enhanced pipeline may be applied to any general predictive task. Thus, the embodiments enable the deployment of PMs to a much larger array of predictive tasks than is possible via conventional systems.

A user may provide a corpus of records to an enhanced PM system, as disclosed herein. At least a portion of the records in the corpus include observed outcomes for a data element (DE) for which a PM is desired. The enhanced PM determines various relationships between the records, as well as among the DEs within the records. The analysis that determines the relationships is an automated process that employs statistical, relational, and inferential techniques to infer the interdependencies, or other relationships, among the records and the DEs. The relationships may be statistical, in the sense that a particular relationship between two records is assigned a statistical level of confidence. The relationships with a higher level of confidence are more heavily weighted in the generation of the PM. A relationship between two records may indicate the nature of the dependency of the two records.

In contrast to conventional predictive systems, the enhanced embodiments herein automatically determine the relationships, and the nature of the relationships, between the various records and DEs of interest. The analysis to determine the relationships may analyze the DEs and the values of the DEs of the records to determine the relationships. At least a portion of these relationships may be explicit within the records or the DEs. In other embodiments, an inferential or statistical analysis may infer implicit relationships between the record and/or the DEs encoded in the records.

In further contrast to conventional predictive systems, the various enhanced embodiments may generate a graph based on the records and relationships between the records. In various embodiments, the nodes include the records and the edges connecting the nodes indicate the automatically determined relationships between the records. In various embodiments, the edges may indicate the nature, or context, of the relationships. In some embodiments, the graph is a directed graph and the edges may be uni- or bi-directional edges. In other embodiments, the graph is an undirected graph. In various embodiments, each record is assigned to a node. In some of these embodiments, a separate node includes, indicates, and/or is associated with a separate record. The edges indicate the relationships between the nodes. Thus, starting with a particular node for a particular record, each other record within the corpus that is either directly or indirectly related (i.e., potentially predictive of) to the particular node may be identified via any one of various graph traversal methodologies. See FIG. 2B for a non-limiting example of such a graph.

Also in contrast to conventional predictive systems, the embodiments herein provide the user with an enhanced user interface (UI) that enables the user to guide the generation of the PM, and provide various user selections for the training and validation of a PM. For example, a user may employ an enhanced graphical UI (GUI) to provide a selection of a DE of interest (DEOI). The DEOI is the DE for which the PM will be trained to predict outcomes. The user may also employ the enhanced GUI to provide a representative value of the DEOI. For instance, for prediction of binary outcomes, the user may specify a query to select a record within the corpus for which a positive outcome of the DEOI is observed. Similarly, the user may select a record within the corpus for which a negative outcome has been observed. In other embodiments, for prediction of multi-valued or sequential outcomes, the user may select a record within the corpus for each value, or a time series of values. In still other embodiments, rather than selecting specific records within the corpus, a user may manually provide selections of the DEOI and the representative values of the DEOI via the GUI.

Based on such user selections, the embodiments determine a relevant set of records. The records included in the relevant set either include a value for the DEOI, and/or are (directly or indirectly) related to records that include a value for the DEOI. That is, a subgraph of the relationship graph is determined and/or generated, where each node in the subgraph is associated with a record that includes a value for the DEOI or is directly or indirectly connected to a node that is associated with a record that includes a value for the DEOI. Various graph traversal techniques or methods may be employed to generate such a subgraph. The subgraph indicates or defines each record that includes values for DEs which are at least potentially predictive of the DEOI. Accordingly, the generation of the relationships and corresponding relationship graph are advantageous over conventional predictive systems. Without such a graph, the automatic identification of relevant records and potentially predictive DEs (PPDEs) would not be possible. Due to the automatic identification and determination of the relevant records and PPDEs, the generation of enhanced PMs of the embodiments is more efficient and outperforms conventional methods for generating PMs. An enhanced performance is realized at least because conventional methods, and methods manually performed via trained specialists, do not include the inference of the relationships between the records and the generations of the graph, which enables the automatic identification of relevant records and PPDEs.

The automatically identified relevant records and PPDEs from the subgraph may undergo a set of automated transformations to derive a set of interim candidate feature PPDEs for the PM. Such transformations may be required or optional, for instance, DEs of type string may be transformed into categorical DEs based on the frequency and distribution of unique valued strings. Similarly, DEs of type date-time may be transformed into day-of-week, date, month, year, or two date-time DEs may be transformed into a time difference DE. Based on the automated identification of the relevant records and the PPDEs, v including the candidate feature PPDEs, various significance tests and transformations are performed on the values of the PPDEs of the relevant records to determine featurized significantly predictive DEs (SPDEs). That is, various significance tests are performed to remove DEs that are either too highly predictive of the DEOI (i.e., leaky DEs, which may indicate DEs representing events synchronous with the outcomes) or too low in their predictive performance (lowly correlated DEs). The values of the SPDEs are transformed to be those that are useful or beneficial in the generation of a PM. That is, the values of the SPDEs are featurized. The relevant records are subdivided into training data sets and validation data sets. A PM is trained, validated, and deployed via the training and validation data sets.

Also in contrast to conventional predictive systems, the various embodiments may train and validate multiple PMs. The values for the hyper-parameters for the PM may be iterated over to determine the optimal, or at least better performing, values that generate the most accurate model via the validation stage. Thus, the enhanced embodiments remove the subjective element of selecting hyper-parameter values, which may degrade the performance of conventional systems. In an embodiment, a PM type and/or a PM implementation is iterated over to determine the optimal, or at least better performing, PM types and PM implementations for a specific predictive task, further increasing the performance of the enhanced embodiments, as related to conventional methods. The trained PM, with the best performing PM type, PM implementation, and/or hyper-parameter values (as indicated via the validation stage) is provided and/or deployed for the user.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, a local area network (LAN) and/or a wide area networks (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100; data structures 120, 140, and 160 described in connection to system 200 described in connection to FIG. 2A. (For instance, in one embodiment, data sources 104a through 104n provide (or make available for accessing) user data to user-data component 210 of FIG. 2A.) Data sources 104a and 104b through 104n may be discrete from user devices 102a and 102b through 102n and server 106 or may be incorporated and/or integrated into at least one of those components. In one embodiment, of data sources 104a through 104n comprise sensors 103a, 107, which may be integrated into or associated with the user device(s) 102a, 102b, or 102n or server 106. Examples of sensed user data made available by data sources 104a through 104n are described further in connection to user-data collection component 210 of FIG. 2A.

Figure 2A:
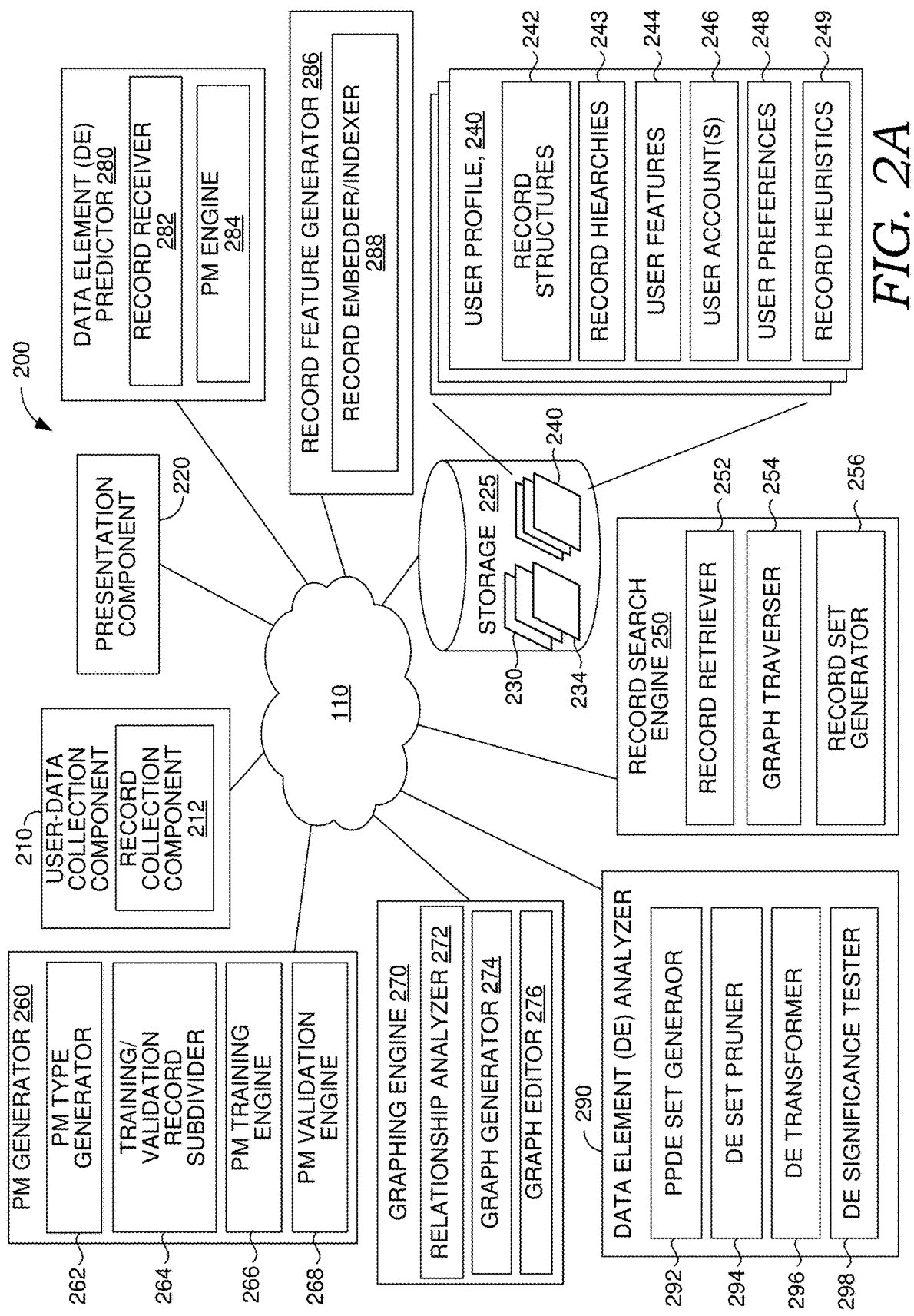
FIG. 2A is a block diagram illustrating an exemplary PM system in which some embodiments of the present disclosure may be employed.

Operating environment 100 can be utilized to implement a component of the components of enhanced PM system 200, described in FIG. 2A, including components for automatically generating, validating, and deploying predictive models (PMs). Operating environment 100 also can be utilized for implementing aspects of process flows 300, 400, 500, 600, and 700 described in conjunction with FIGS. 3-7.

Referring now to FIG. 2A, in conjunction with FIG. 1, a block diagram is provided showing aspects of an example computing system architecture suitable for implementing an embodiment of the disclosure and designated generally as an enhanced system 200 for automatically generating, validating, and deploying predicative models (PM) (i.e., PM system 200). Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

The PM system 200 includes network 110, which is described in connection to FIG. 1, and which communicatively couples components of PM system 200, including but not limited to user-data collection component 210, presentation component 220, user profile 240 (through storage 225), record search system 250, PM generator 260, graphing engine 270, data element (DE) predictor 280, record feature generator 286, and DE manager 290. Storage 225 may store a PM generated, validated, and deployed via PM system 200.

PM system 200 provides an enhanced pipeline for the generation, validation, and deployment of a machine-based PM, such as but not limited to a machine learning (ML) model. In the various embodiments, PM system 200 receives a corpus of records and determines relationships between records of the corpus. More particularly, system 200 may determine relationships between record types and/or instances of records included in the corpus. That is, relationships between various instances of records may be determined, as well as various inter-record and intra-record relationships between DEs and DE types included in the various instances of records and record types of the corpus. In some embodiments, a graph indicating and/or encoding such record/DE relationships are generated. That is, a record/DE relationship graph is generated. See FIG. 2B. The nodes of the graph may include record instances and/or record types within the corpus. The edges of the graph may indicate various information regarding the relationships, i.e., various aspects, types, contexts, semantics, or sentiments of the relationships. A knowledge graph may be generated indicating knowledge regarding the relationships between record types, instances of records, DE types, instances of DEs, and any other such relationships.

In addition to the corpus of records, system 200 receives a selection of a DE of interest (DEOI). Via an enhanced user interface (UI), a user may select a DE type or a particular instance of a DE included in a record within the corpus. The DEOI may be associated with an outcome (e.g., successful sale, sales prediction, or revenue) of a value for which the user wishes to predict via an automatically generated PM. For example, a user may select a DEOI type that indicates an event, such as but not limited to a business outcome. Via the UI, system 200 also receives a user selection of a representative value of the DEOI. A user may provide a value for the DEOI that is associated with a positive (or successful) outcome of an event designated by the DEOI. Similarly, a user may provide a value for the DEOI that is associated with an unsuccessful (or negative) outcome. In some embodiments, the user may select a record that includes instances of positive and/or negative outcomes, as indicative of the values of the DEOI included in the record.

In general, and based in the determined relationships, the DEOI, the representative values of the DEOI, and the corpus, system 200 generates, validates, and deploys a PM that is trained to, in response to receiving a record that do not include a value for the DEOI, predict a value of the DEOI. System 200 processes the corpus of records to generate training and validation datasets. After processing, a set of training records (i.e., a training data set) and a set of validation records (i.e., a validation data set) may be generated from the processed corpus. The training data and the representative value of the DEOI are employed to generate a PM that is trained to predict a value of the DEOI based on a record that is not included in the training data and/or a record that does not include a value for the DEOI. The validation data is employed to validate the trained PM. Upon validation, system 200 deploys the trained and validated PM, such that a user may employ the PM to predict or anticipate future events, trends, conditions, performance, or the like of the DEOI based on inputs that do not include a value for the DEOI.

More specifically, and based on the relationships between the records of the corpus and the DEs of the records, as well as a selection of a DEOI and a representative value of the DEOI, training and validation data sets are generated from the corpus. The training and validation data sets from the corpus are employed to train, validate, and deploy a PM. System 200 generates a set of relevant records from the corpus. For example, a sub-graph of the relationship graph indicating the records and DEs relationships may be determined. The set of records mapping to the nodes of such a sub-graph may be aggregated to generate a sub-set of relevant records. A set of potentially predictive data elements (PPDEs) are generated from the set of relevant records. PPDEs that are statistically insignificant and/or sparse may be pruned from the set PPDEs. The set of PPDE may be further analyzed to determine the most significantly predictive DEs (SPDES) with the set of PPDEs. A set of PPDEs may be generated from the set of PPDEs based on the significance of each PPDE, e.g., the set of SPDEs may be a subset of the set of SPDEs. System 200 may transform the values for of the SPDEs within the set of relevant records, such that the transformed values are represented as multi-dimensional features of the records. That is, the set of relevant records may be featurized. System 200 generates a training data set and a validate data set from the transformed and/or featurized set of relevant records. A PM is trained, validated, and deployed via the training dataset and validation dataset.

User-data collection component 210 is generally responsible for accessing or receiving (and in some cases also identifying) user data from a data source, such as data sources 104a and 104b through 104n of FIG. 1. As used throughout, user data may include records, user selections of DEOI, and user selections of representative values of DEOIS. User-data collection component may receive user selections of DEOIs and/or representative values of DEOIs.

User-data collection component 210 may include a record collection component 212. In various embodiments, record collection component 212 is enabled to receive the corpus of records from a user. In some embodiments, record collection component 212 may be employed to facilitate the collection, or accumulation, of records from users of PM system 200. In the various embodiments, record collection component 212 collects or accumulates records to generate the corpus. In some embodiments, the records may be crowd-sourced via the collection or accumulation of records from a plurality of users. The data encoded in the records may be received (or accessed), and optionally accumulated, reformatted and/or combined, by record collection component 212 and stored in a data store, such as storage 225, where it may be available to other components of the PM system 200.

User data may further include user selections and/or determinations of relationships between records, DEs, and the like. As discussed throughout, the various embodiments determine relationships between records, as well as between DEs included in the records. The user may provide at least a portion of these relationships as user-data, via an enhanced graphical UI (GUI). Presentation component 220 may be employed in conjunction with user-data collection component 210 to receive the corpus of records, as well as user selection of DEOIs and representative values of DEOIs. For example, presentation component 220 may provide the user with one or enhanced GUIs to receive various user data. Further, the user-data collection component 210 may be configured to associate user data included in a user profile of user profiles 240 with a record and/or store a record as user data store in user profile 240.

Graphing engine 270 is generally responsible for determining the relationships between records (included in the corpus received and/or aggregated via record collection component 219) and DEs of the records, as well as generating a graph indicating the relationships. In various embodiments, graphing engine 270 may include a record and DE relationship analyzer 272, a graph generator 274, and a graph editor 276. Relationship analyzer 272 may infer the relationships via inferential logic and/or statistical/inferential analyses of the corpus. Graph generator 274 may generate the corresponding graph. Graph editor 276 may enable a user, through the enhance GUI, to manually edit the graph, or at least provide guidance for the determination of the relationships and the generation of the graph.

The relationships may be determined based on the structures of the records, hierarchies of the records, heuristics, and/or user guidance. As discussed throughout, the user may provide at least a portion of the record structures, hierarchies, and/or heuristics. In some embodiments, at least a portion of the record structures, hierarchies, and/or heuristics may be inferred via an inferential and/or statistical analysis of the corpus. For example, relationship analyzer 272 may analyze the corpus of records and determine the record structures, hierarchies, and/or heuristics, as well as the inter- and intra-record/DE relationships. The relationships may include varying levels of confidence based on ambiguities within the corpus of records. For example, statistical inference techniques may be employed to determine confidence levels of the relationships. The relationships may indicate the dependencies of the various records.

Graph generator 274 generates a graph that indicates the determined relationships. The nodes of the graph may include instances of the records and the edges of the graph may indicate the relationships, and context of the relationships, between the records and the DEs. For example, graph generator 274 may generate a node for each of the records included in the corpus. Graph generator 274 may generate a directed or undirected edge between any pair of nodes that includes a relationship. The edge may indicate the nature and/or context of the relationship. In some embodiments, the edge may indicate a statistical confidence level, or other statistical metric, indicating a probabilistic aspect of the relationship.

Figure 2B:
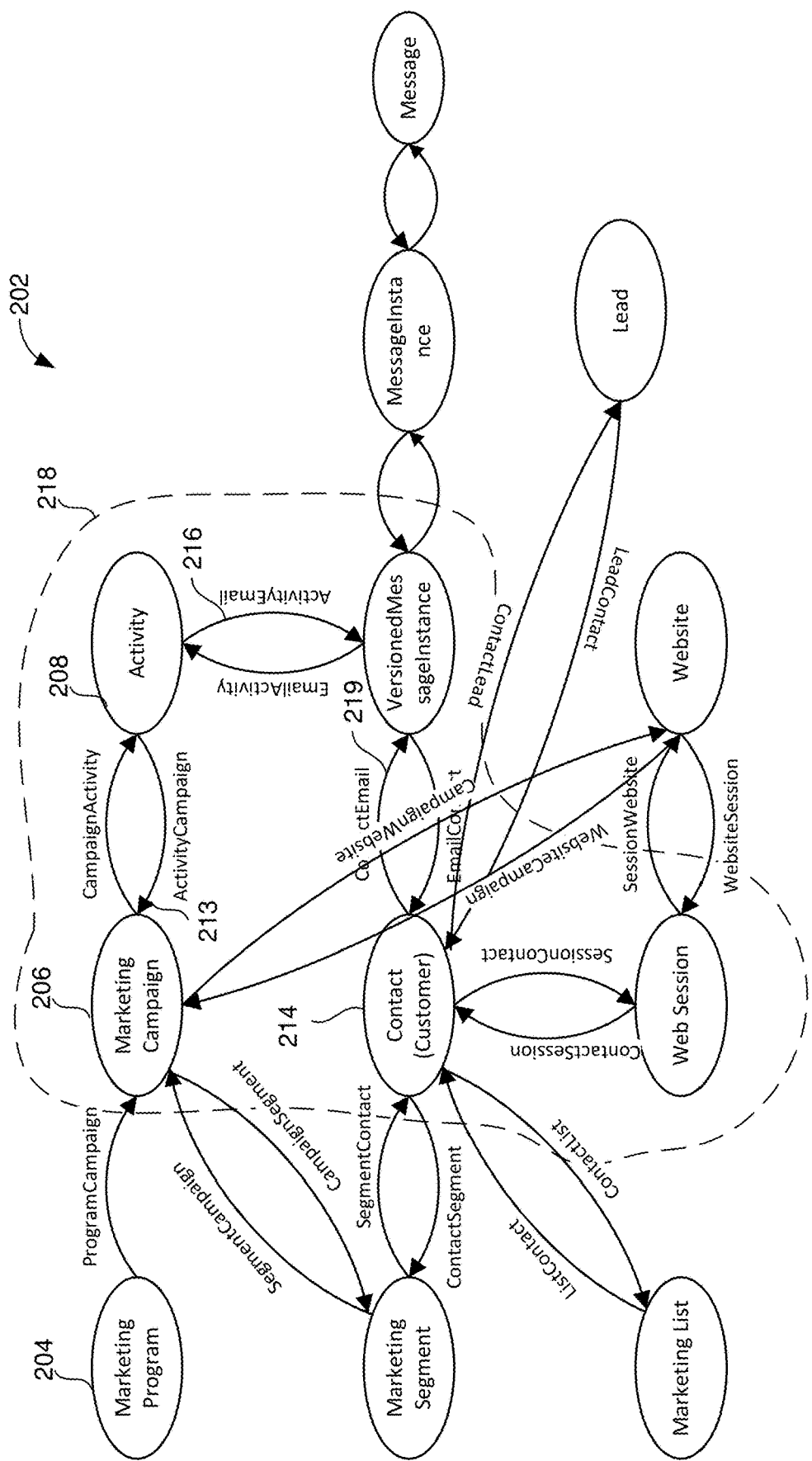
FIG. 2B illustrates a non-limiting example of a record relationship graph generated by the various embodiments herein.

For example, graph generator 274 may generate graph 202 of FIG. 2B. FIG. 2B illustrates a non-limiting example of a record relationship graph 202 generated by the various embodiments. Graph 202 includes a plurality of nodes, such as but not limited to nodes 204, 206, 208, and 214. Each of these nodes may correspond to an instance of a record in the corpus, or a record type included in the corpus. Node 204 corresponds to a record that includes a DE relating to a marketing program of an entity associated with the corpus of records. Node 206 corresponds to a record encoding information about a market campaign of the entity. Node 208 corresponds to record encoding information about an activity, such as a marketing campaign, of the entity. Node 214 corresponds to a record encoding contact information for a customer of the entity.

Graph 202 includes a plurality of directed edges that indicate relationships between the nodes/records, such as but not limited to edges 213, 216, and 219. The edges indicate the nature, or context, of the determined relationships, as well as the direction of the inter-relationship and/or dependency of the underlying records. For example, edge 213 indicates the nature of the relationship between nodes 206 and 208. As discussed throughout, the various embodiments may determine a relevant set of records by determining a connected subgraph. FIG. 2B shows one exemplary embodiment of a subgraph 218. Subgraph 218 includes nodes 206, 208, and 214 and excludes node 204. Note that nodes 206 and 208 are directly connected via edge 213, whereas nodes 206 and 214 are indirectly connected via edges 213, 216, and 219. Although not shown in FIG. 2B, because the relationships may include varying levels of confidence, the edge of the graph, which indicates the relationships, may additionally indicate the statistical levels of confidence of the various relationships.

Returning to FIG. 2A, graph editor 276 may enable a user to edit the graph. Editing the generated graph may enable the user to edit, modify, and/or update the determined relationships. That is, when a user edits the graph via graph editor 276, graphing engine 270 updates and/or edits the relationships indicated by the nodes and edges of the graph in correspondence to the user's edits. For example, the user may provide user guidance for the determination of the relationship via editing the graph. The user may manually edit the nodes and/or edges of the graph via graph editor 276. The GUI provided via user-data collection component 210 may enable a user to provide various record structures, record hierarchies, heuristics, and other user guidance for the determination of the relationships.

Record search engine 250 is generally responsible for searching records and/or relationships of records within the graph generated via graphing engine 270. Record search engine 250 may include record retriever 252, graph traverser 254, and record set generator 256. Relationship analyzer 272 may employ record retriever to retrieve records in the corpus to analyze the underlying relationships. Graph traverser 254 may be employed to traverse the graph via various graph traversal methods. Traversing the graph enables the generation or determination of a connected subgraph, such as but not limited to subgraph 218 of FIG. 2B. Record set generator 256 may be employed to determine a set of related records, via the directly or indirectly connected nodes of a subgraph generated by graph traverser 254. For example, record set generator 256 may determine a relevant set of records via the determination of a subgraph that includes all the nodes/records that either include a value for the DEOI, or are directly/indirectly related (via a graph edge) to a record that includes a value for the DEOI.

DE analyzer 290 is generally responsible for analyzing the DEs of the record, including the DEs included in the relevant set of records identified or determined via the functionalities of the graphing engine 250 and the record search engine 250. In particular, DE analyzer 290 is responsible for determining a set of potentially predictive DEs (PPDEs), where a PPDE included in the set of PPDEs is included in the records of the relevant set of records. The sets of PPDEs is pruned (i.e., a PPDE is removed from the set) based on various significance tests, sparsity tests, correlations tests, and so on. A set of significantly predictive DEs (SPDEs) is generated from the remaining PPDEs. That is, the PPDEs that are not pruned or removed from the set of PPDEs are treated as SPDEs. The values of the SPDEs with the records of the relevant set of records are featurized, i.e., the values of the SPDEs are transformed to be encoded in computationally useful representations or values. For example, the SPDEs may be embedded within a vector space of a PM type and/or implementation of the PM.

To carry out these various tasks associated with generating a PM, DE analyzer 290 may include a DE set generator 292, a DE set pruner 294, a DE transformer 296, a DE significance tester 298, and a SPDE set generator. DE set generator 292 is generally responsible for determining the DEs that are included and/or have values included in the records of the relevant set of records. The DE set generator 292 generates a set of PPDEs from the DEs that are included in the records of the relevant set of records. More particularly, each DE within the determined set of PPDE is a DE or attribute of the records that is a signal within the relevant set of records that is potentially predictive of the DEOI. DE set generator 292 may analyze the occurrence and/or frequency of the various DEs included in the records of the relevant set of records. Those DEs that are potentially predictive of the DEOI are included in the set of PPDEs. For example, those DEs that are related through the graph to the DEOI may be included in the set of PPDEs. DE that are included in the records of the relevant set of records with at least a threshold frequency may be included in the set of PPDEs.

The DE set pruner 294 may be responsible for pruning or removing DEs from the set of PPDEs based on various DE density and/or sparsity requirements and the relevant set of records. In various embodiments, the DE set pruner 294 may prune the set of PPDEs based on sparsity requirements or thresholds. For example, DEs included in the set of PPDEs with sparsely populated values within the relevant set of records may be removed. The remaining DEs included in the pruned set of PPDEs are treated as attributes of the records in the relevant set of records that may be predictive of outcomes associated with the DEOI.

DE transformer 296 is generally responsible for transforming the values of the SPDEs into quantities or values that enable the training and validation of a PM. More particularly, DE transformer 296 may apply a transformation to the values of the PPDEs of the records included in the relevant set of records. Such transformations may include representing string values as numerical values, e.g., categorical representation of strings. For example, different string values representing similar DEs may be transformed into a unique single numerical value. Various clustering analyses may be performed on the values of the PPDEs. The string value for each PPDE included in a particular cluster is transformed into a particular numerical value, such that the transformed values of the PPDEs included in a cluster are all the same value, e.g., an index value. Thus, DE transformer 296 may perform a dynamic indexing of the values of the PPDEs. The transformed values may include vector values. Thus, DE transformer 296 may perform various vector embeddings of the transformed values of the PPDEs.

The DE significance tester 298 may test each of the remaining PPDEs for significance and/or correlations with the DEOI. Based on various significance and/or correlation thresholds, the DE set pruner 298 may further prune or remove DEs from the set of PPDEs that are either too highly correlating or too lowly correlating with predictions of the DEOI. More particularly, DE significance tester determines and/or generates the significance of each PPDE value in the set of PPDEs. The significance of a PPDE may be with respect to the correlation with predicting a value of the DEOI. The DE significance tester 298 may be employed to determine a statistical significance of each of the PPDEs based on a statistical analysis of the transformed values, the PM type and implementation, the DEOI and its representative values, and the like. That is, a significance test for the correlation of the values of a PPDE with the values of the DEOI is performed. In various embodiments, an area under the curve (AUC) significance test may be applied to the values of the PPDEs. For example, in embodiments where the DEOI can be transformed into a classification value (such as a numerical value that indicates a binary classification of the DEOI), a receiving operating characteristic (ROC) curve may be generated for each of the PPDEs. The significance of each of the PPDES may be determined and/or generated via a weak AUC test for the ROC curves. The significance of a PPDE may indicate the significance of the correlation with values of the DEOI. For example, the significance of a PPDE may be a significance metric that indicates a false positive and/or a false negative predictive result in a binary classification of the DEOI.

The DE set generator 292, DE significance tester 298, and the DE set pruner 294 may work in conjunction to determine and/or generate a set of significantly predictive DEs (SPDEs) based on the significance of the PPDEs in the set of PPDEs. DE set pruner 294 may remove or prune the PPDEs with either too high or too low correlations with the DEOI from the set of PPDEs. The PPDEs that remain may be significantly predictive of an outcome or value of the DEOI. For example, the PPDEs with low correlation with the binary classification of the DEOI may be removed or pruned from the set of PPDEs. Similarly, for PPDEs where the correlation with the classification of the DEOI is too high, such "leaky" PPDEs may be removed and/or pruned from the set of PPDEs. Thus, DE set pruner 294 may employ upper and lower correlation (or significance) thresholds to remove PPDEs and generate the set of SPDEs. DE set generator 292 may generate the set of SPDEs based on the pruning of the too high/low correlating PPDEs from the set of PPDEs.

Record feature generator 286 is generally responsible for generating features for the SPDEs included in the set of SPDEs. As discussed throughout, record feature generator 286 is employed to featurize SPDEs included in the set of SPDEs. That is, record feature generator 286 may generate a feature for each of the values of SPDE included in the set of SPDEs for the records included in the relevant set of records. That is, the SPDEs included in the records of the relevant set of records are featurized via DE transformer. Featurizing the SPDEs may include embedding the SPDEs within a multi-dimensional vector. In various embodiments, the SPDEs may be encoded as multi-dimensional vectors based on the PM type and the PM implementation. In various embodiments, record feature generator 286 transforms the values of the SPDEs in the records into a feature, such as but not limited to a latent or a hidden feature. Record feature generator may include a record embedder/indexer 288. Record embedder/indexer 288 may embed the featurized PPDEs in a vector space. That is, record embedder/indexer 288 may encode the SPDEs as a vector in a multi-dimensional space.

PM generator 260 is generally responsible for generating (i.e., training and validating) a PM. To carry out the generation of a PM, PM generator 260 may include a PM type generator 292, training/validation record subdivider 264, PM training engine 266, and a PM validation engine. PM type generator 262 may determine the type and implementation for the PM based on the relevant set of records and other factors. PM type generator may determine or select a PM type based on the pruned set of PPDEs (or the set of SPDEs) and the relevant set of records. PM type generator 262 may determine or select the type of PM to train and validate based on the pruned set of PPDEs and relevant set of records. PM type generator 262 may analyze the pruned set of PPDEs to determine the type of PM that is most advantageous for predicting outcomes of the DEOI based on the PPDE and the records included in the relevant set of records. PM type generator 262 may employ various heuristics to determine the PM type. The selected PM type may include, but is not otherwise limited to linear regression models, logistic regression models (e.g., classifiers), (directed or undirected) graph models, clustering models, Bayesian networks, decision tree models, support vector machine models, mixture models, expectation maximization (EM) models, Markov models, Monte Carlo models, reinforcement learning models, and the like.

Additionally, PM type generator 262 may determine or select an implementation for the PM type. The determined PM implementation may be based on the PM type. PM implementations may include, but are not otherwise limited to, a neural network, such as but not limited to feed forward neural networks, recurrent neural networks (RNN), long/short term memory (LSTM) neural networks, convolutional networks, deconvolutional networks, and the like. Any implemented neural networks may be a deep or shallow network. In at least some embodiments, the user may select the PM type and/or the PM implementation Training/validation record subdivider 264 is generally responsible for generating training and validation data sets by subdividing the relevant set of records into training and validation records. Training/validation record subdivider 262 generates a training data set and a validation data set from the relevant set of records that includes the featurized SPDEs. In various embodiments, the relevant set of records is subdivided into training records and validating records to generate the training and validation data sets respectively.

The PM training engine 266 is generally responsible for training the PM of the identified PM type and PM implementation. As discussed throughout, the PM training engine 266 may select and iterate over hyper-parameters for the PM. PM training engine 266 trains the PM based on the PM type and implementation, as well as the featurized training data set and the selected values for the hyper-parameters. PM training engine 266 may employ various machine learning (ML) techniques based on the PM type and PM implementation. For example, various supervised (e.g., linear or non-linear regression) or unsupervised (e.g., k-mean clustering analysis) ML techniques may be employed. In one non-limiting embodiment, when the PM is a classifier model (implemented via regression), various supervised learning techniques that employ the training data set may be used. A classifier model may be a binary classifier with two classes. One of the classes may be associated with a positive outcome of the DEOI and the other class is associated with a negative outcome of the DEOI. In such binary classifiers the DEOI may take on two values, one for the positive outcome and another value for the negative outcome. In other embodiments, a classifier model may include more than two classes. Whether a binary classifier, or a classifier with more than two classes, the DEOI may be valued at separate values for each of the classes. Thus, the values of the DEOI may be multi-valued. The DEOIs within the relevant set of records may serve as labeled training data, where the representative values of the DEOI are employed to determine classification labels. In other embodiments, an unsupervised clustering learning technique may be employed. In some embodiments, when a neural network is employed to implement the PM, backpropagation may be employed to generate the model's network weights or other parameters.

The PM validation engine 268 is generally responsible for validating a trained PM model. PM validation engine 268 may be further responsible for determining the best performing PM, when more than one PM is trained. For example, PM validation engine 268 may identify the best performing PM when the hyper-parameters, or even PM type or implementation, is varied or iterated over. PM validation engine 268 may employ the validation data set to validate the PM trained by PM training engine 266. The validation may generate an accuracy metric for the selected hyper-parameters based on the validation of the trained PM.

PM validation engine 268 may also identify and/or select the best performing PM based on the validation of the PM, i.e., the accuracy metric. That is, the most accurate (or better performing) PM is selected via the accuracy metrics. In some embodiments, the user is provided the option for selecting which of the PMs to select.

DE predictor 280 is generally responsible for providing and deploying the trained and validated PM. DE predictor 280 is enabled to predict outcomes (i.e., values) for a DEOI based on inputs that do not include a value for the DEOI. DE predictor 280 includes a record receiver 282 and a PM engine 284. Record receiver 282 receives an input record that do not include a value for the DEOI. The PM engine 284 is enabled to employ a trained PM to determine a value for the DEOI, based on the input record received by the record receiver 284.

The components of PM system 200 may be embodied as a set of compiled computer instructions or functions, program modules, computer software services, or an arrangement of processes carried out on a computer system. It should be understood that the PM system 200 shown in FIG. 2 is an example of one system in which embodiments of the present disclosure may be employed. Each component shown may include a computing device similar to the computing device 900 described with reference to FIG. 9. The PM system 200 should not be interpreted as having any dependency or requirement related to any single module/component or combination of modules/components illustrated therein. Each may comprise a single device or multiple devices cooperating in a distributed environment. For instance, the PM system 200 may comprise multiple devices arranged in a distributed environment that collectively provide the functionality described herein. Additionally, other components not shown may also be included within the network environment. It should be understood that the PM system 200 and/or its various components may be located anywhere in accordance with various embodiments.

Example system 200 also includes storage 225. Storage 225 generally stores information including data, computer instructions (e.g., software program instructions, routines, or services), and/or models used in embodiments of the technologies described herein. In an embodiment, storage 225 comprises a data store 234 (or computer data memory). Data store 234 may store a record, corpus of records, and/or a trained and validated PM. Storage 225 may also include pattern inference logic 230. Briefly, pattern inference logic 230 may include machine learning, statistical, and/or artificial intelligence logic that is enabled to detect, infer, or otherwise recognize patterns and or features within data. For instance, pattern inference logic 230 may infer explicit, latent, or hidden synchronization features or patterns within user and/or record data. Further, although depicted as a single data store component, storage 225 may be embodied as a data store or may be in the cloud.

By way of example and not limitation, data included in records and PMs, as well as any user data, may generally be referred to throughout as data. Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; etc.) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, PMs, records, and/or predictions may be provided in user signals. A user signal can be a feed of various data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 and/or record collection component 212 receives or accesses data continuously, periodically, or as needed.

System 200, or its subcomponents, may determine a device name or identification (device ID) for each device associated with a user. This information about the identified user devices associated with a user may be stored in a user profile associated with the user, such as user profile 240. In an embodiment, the user devices may be polled, interrogated, or otherwise analyzed to determine information about the devices. This information may be used for determining a label or identification of the device (e.g., a device ID) so that the user interaction with the device may be recognized from user data. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

In embodiments using contextual information related to user devices, a user device may be identified by detecting and analyzing characteristics of the user device, such as device hardware, software such as operating system (OS), network-related characteristics, user accounts accessed via the device, and similar characteristics. For example, as described herein, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user profile 240. In an embodiment, the user devices may be polled, interrogated, or otherwise analyzed to determine contextual information about the devices. This information may be used for determining a label or identification of the device (e.g., a device ID) so that user activity on one user device may be recognized and distinguished from user activity on another user device. Further, as described herein, in some embodiments, users may declare or register a user device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

Data stored in user profile 240 (to this point) will now be discussed and summarized. User profile 240 may include various information or data associated with a user. As such, user profile 240 may include record structures 242, record hierarchies 243, user features 244, user accounts 246, user preferences 248, and record heuristics 249. Record structures 242, record hierarchies 243, and record heuristics 249 may be provided to system 200 to enable the generation of a trained PM, as discussed throughout. As described herein, user features 244 in user profile 240 are generated based on different user signals, such as location history, user accounts, etc.

User features 244 generally include those features related to the user. User account(s) data 246 generally includes user data collected from user-data collection component 210 and/or record collection component 212 (which in some cases may include crowdsourced data that is relevant to the particular user) or other semantic knowledge about the user. In particular, user account(s) data 246 can include data regarding user emails, texts, instant messages, calls, and other communications; social network accounts and data, such as news feeds; online activity; calendars, appointments, or other user data that may have relevance for determining unaddressed events; user availability; and importance, urgency, or notification logic. Embodiments of user account(s) data 246 may store information across a database, knowledge graph, or data structure. User preferences 248 generally include user settings or preferences associated with the user or user records. By way of example and not limitation, such settings may include user preferences about specific meetings (and related information) that the user desires be explicitly monitored or not monitored or categories of activities to be monitored or not monitored, crowdsourcing preferences, such as whether to use crowdsourced information, or whether the user's user-record structures 242, record heuristics 249, and/or record hierarchies 243 may be shared as crowdsourcing data.

As noted above, pattern inference logic 230 contains the rules, conditions, associations, classification models, and other criteria to execute the functionality of any of the components, modules, analyzers, generators, and/or engines of systems 200. The presentation component 220 functions to render various interfaces and various other outputs generated by the PM system 200 and the components thereof in a format that can be displayed on user devices.

Figure 3:
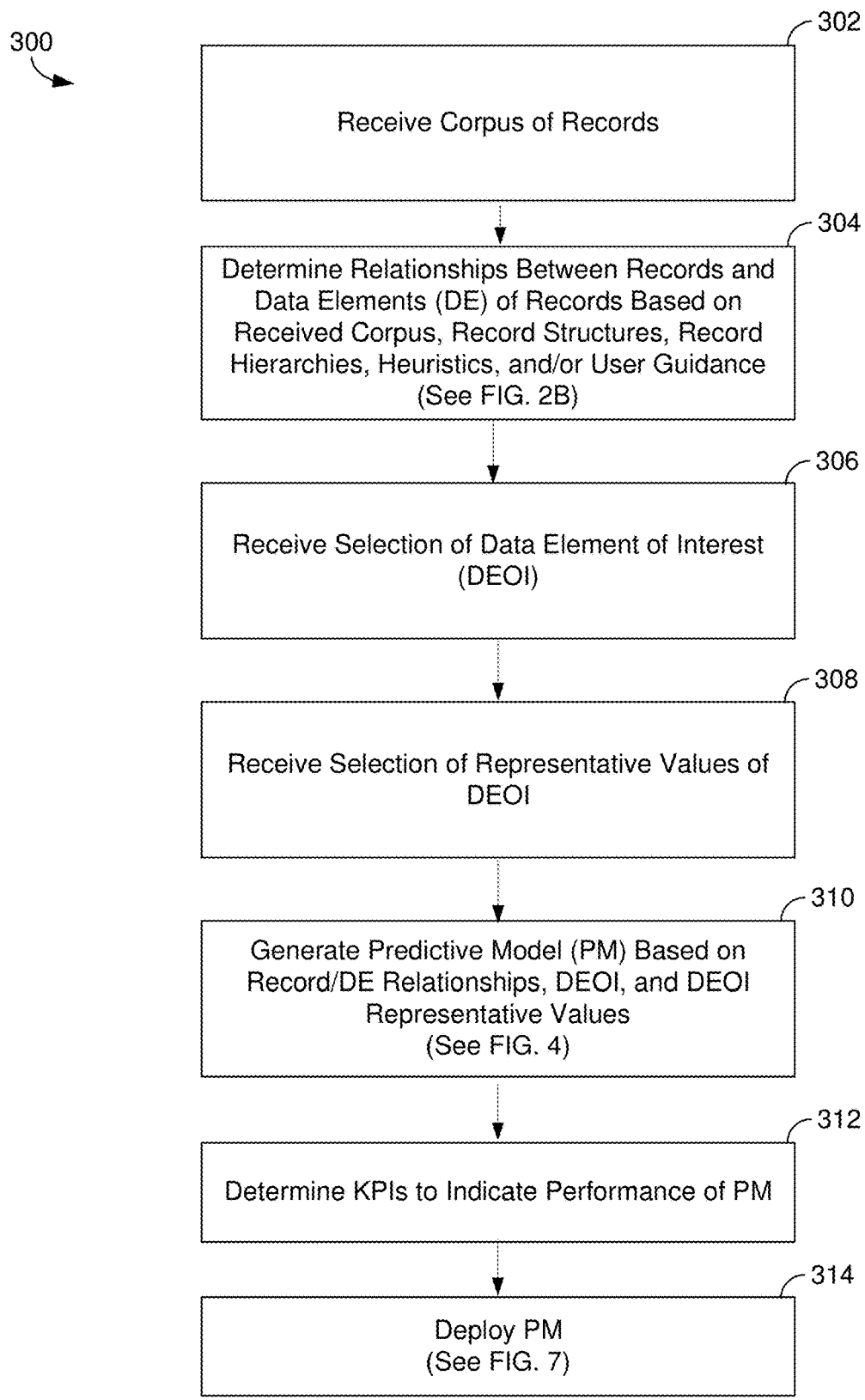
FIG. 3 provides a flow diagram that illustrates a method for providing a trained and validated predictive model in accordance with an embodiment of the present disclosure.

Turning now to FIG. 3, a flow diagram is provided that illustrates a process 300 for providing a trained and validated predictive model (PM) in accordance with an embodiment of the present disclosure. At least portions of process 300 may be enabled by, performed by, and/or carried out by devices and/or components included in operating environment 100 of FIG. 1 and/or PM system 200 of FIG. 2A.

Process 300 begins at block 302, where a corpus of records is received. In some embodiments, a record collection component, such as record collection component 212 of FIG. 2A, may receive and/or aggregate a plurality of records to generate the corpus. The records may be business records associated with a business entity.

At block 304, various relationships between records and data elements (DEs) of the records of the received corpus are determined and/or generated. The relationships may be determined based on the structures of the records, hierarchies of the records, heuristics, and/or user guidance. The user may provide at least a portion of the record structures, hierarchies, and/or heuristics. In some embodiments, at least a portion of the record structures, hierarchies, and/or heuristics may be inferred via an inferential and/or statistical analysis of the corpus. For example, a relationship analyzer, such as relationship analyzer 272 of FIG. 2A, may analyze the corpus of records and determine the record structures, hierarchies, and/or heuristics, as well as the inter- and intra-record/DE relationships. The relationships may include varying levels of confidence based on ambiguities within the corpus of records. For example, statistical inference techniques may be employed to determine confidence levels of the relationships. Graph generator 274 of FIG. 2A may generate a graph that indicates the determined relationships. The nodes of the graph may include instances of the records and the edges of the graph may indicate the relationships between the records and the DEs. For example, graph generator 274 may generate graph 202 of FIG. 2B. Because the relationships may include varying levels of confidence, the edge of the graph, which indicates the relationships, may additionally indicate the statistical levels of confidence of the various relationships. A graph editor, such as graph editor 276 may enable a user to edit the graph. Editing the generated graph may enable the user to edit, modify, and/or update the determined relationships. That is, when a user edits the graph, graphing engine 270 updates and/or edits the relationships indicated by the nodes and edges of the graph in correspondence to the user's edits. For example, the user may provide user guidance for the determination of the relationship via editing the graph. The user may manually edit the nodes and/or edges of the graph via graph editor 276. User-data collection component 210 may enable a user to provide various record structures, record hierarchies, heuristics, and other user guidance for the determination of the relationships.

At block 306, a selection of a data element of interest (DEOI) is received. A user may employ user-data collection component 210 to provide a selection of a DEOI included in a record of the corpus. The DEOI may be an instance of a DE and/or a DE type. At block 308a representative value of the DEOI is received. A user may similarly provide selections of a value of the DEOI included in a record instance of the corpus via user-data collection component 210. The representative values may indicate a successful event. Another of the representative values may indicate an unsuccessful event. The user may indicate a record included in the corpus that include the DEOI and/or the representative values of the DEOI. In some embodiments, a user may provide a set of values. The set of values of the DEOI may be classes for a classifier model, such as but not limited to a binary classifier model. For example, user may provide a first value and a second value representing a binary outcome, where the first and second values represent positive and negative outcomes respectively.

At block 310, a PM is generated based on the record and DE relationships, the DEOI, and the representative values of the DEOI. Various embodiments of generating a PM are discussed in conjunction with at least process 400 of FIG. 4. However, briefly here, featurized training and validation data sets are generated from the corpus. The featurized training data is employed to train a PM and the validation data is employed to validate the PM.

At block 312, a key performance indicator (KPI) of the model is determined. The various KPIs may include metrics that indicate the performance of the model. The KPIs may be provided to a user. At block 314, the generated PM is deployed. Various embodiments of deploying the PM are discussed in conjunction with process 700 of FIG. 7. However, briefly here, the trained and validated PM is provided to a user. The user may employ the PM to generate predictions of values of the DEOI based on input data that does not include values for the DEOI. Rather, the PM is trained to predict the values of the DEOI based on other input data.

Figure 4:
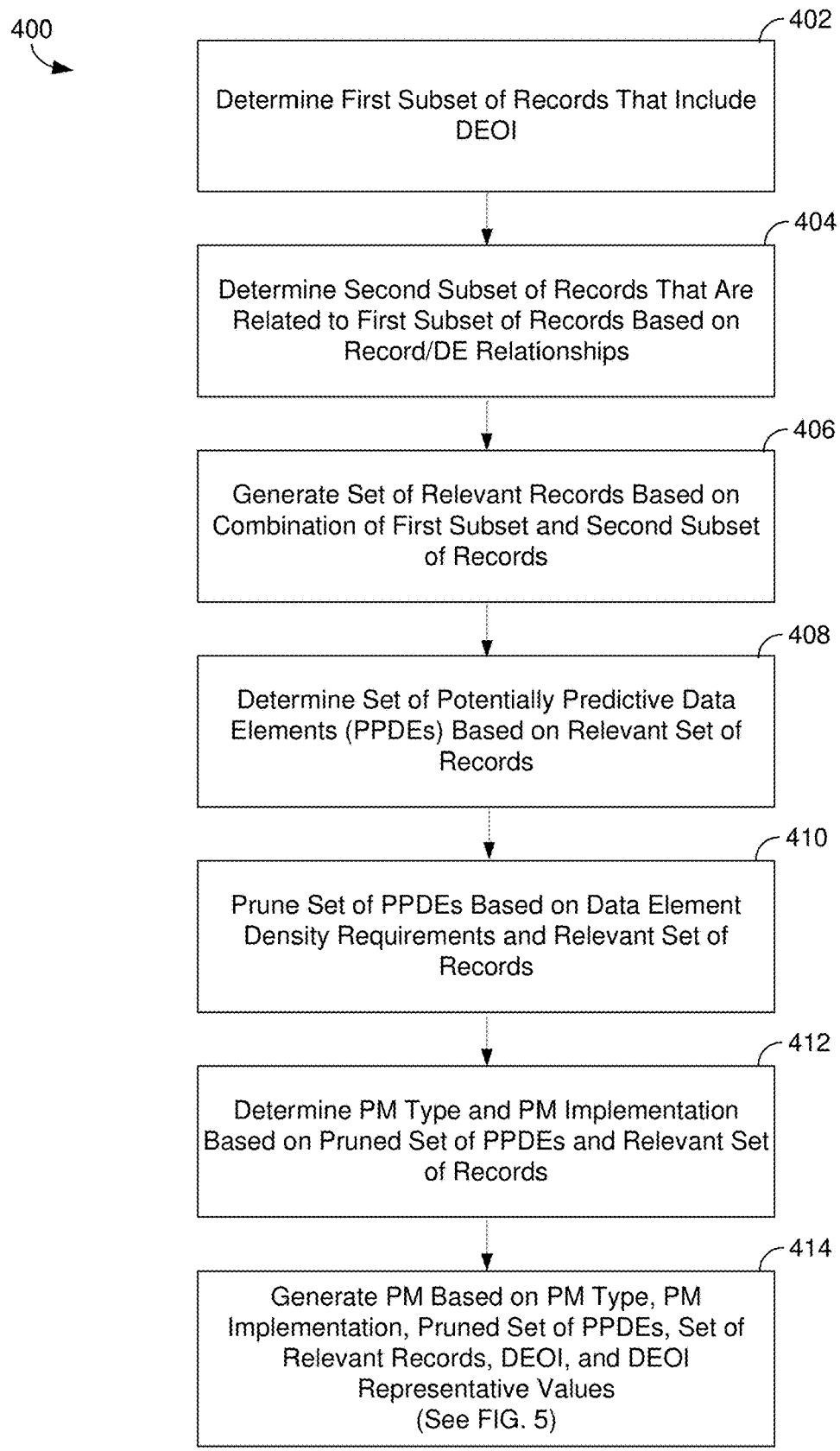
FIG. 4 provides a flow diagram that illustrates a method for determining potentially predictive data elements and a predictive model type for generating a predictive model in accordance with an embodiment of the present disclosure.

Turning now to FIG. 4, a flow diagram is provided that illustrates a process 400 for determining potentially predictive data elements and a predictive model (PM) type for generating a PM in accordance with an embodiment of the present disclosure. At least portions of process 400 may be enabled by, performed by, and/or carried out by devices and/or components included in operating environment 100 of FIG. 1 and/or PM system 200 of FIG. 2A.

Process 400 begins at block 402, where a first subset of records of the corpus is determined. Each of the records in the first subset of records may include the DEOI. For example, a list or array that indicates each record of the corpus that includes a value for the DEOI may be generated. Record search engine 250 of FIG. 2A may search the records to determine which records include the DEOI. For example, record retriever 252 may retrieve each record that includes a value of the DEOI and generate the list or array. That is, record search engine 250 may query the corpus of records for records with a resolved outcome. The resolved outcomes may include various values for the DEOI, i.e., the resolved outcomes include both positive and negative outcomes. Record set generator 256 may generate the first subset of records based on the list or array. The first subset of records may include records associated with or corresponding with a node of the graph.

At block 404, a second subset of records of the corpus is determined. In some embodiments, each record that that is directly or indirectly connected to a record in the first subset of records via an edge of the graph is included in the second subset of records. Graph traverser 254 may traverse the graph to determine each record that is directly or indirectly related to a node corresponding to the first subset of records. For example, graph traverser 254 may systematically analyze each node included in the first subset of records to identify each of the other nodes of the graph that is directly or indirectly connected to the nodes in the first subset of records. A list or array of each of these other nodes may be generated. Record set generator 256 may generate the second subset of records based on this list or array.

At block 406, a relevant set of records is generated based on the combination of the first and second subset of records. Record set generator 256 may be employed to determine the union of the first and second subset of records (i.e., nodes). Note that the relevant set of records is a connected subgraph of the graph. Thus, throughout, the set of relevant records may be referred to as a relevant subgraph of the graph of relationships. As discussed throughout, each record in the relevant set of records may corresponds to a node in the subgraph. The record may also correspond to the associated node's particular relationship with the DEOI, including a self-relationship. A record of the relevant set of records may correspond to an n-tuple that includes a node in the subgraph.

At block 408, a set of potentially predictive data elements (PPDEs) is determined from the relevant set of records. Each DE within the determined set of PPDE is a DE or attribute of the records that is a signal within the relevant set of records that is potentially predictive of the DEOI. A DE analyzer, such as but not limited to DE analyzer 290 of system 200, may determine the potentially predicative signals within the records of the corpus. For example, PPDE set generator 292 may analyze the occurrence and/or frequency of the various DEs included in the records of the relevant set of records. Those DEs that are potentially predictive of the DEOI are included in the set of PPDEs. For example, those DEs that are related through the graph to the DEOI may be included in the set of PPDEs. DEs that are included in the records of the relevant set of records with at least a threshold frequency may be included in the set of PPDEs.

At block 410, the set of PPDEs are pruned based on various DE density and/or sparsity requirements and the relevant set of records. In various embodiments, the DE set pruner 294 may prune the set of PPDEs based on sparsity requirements or thresholds. For example, DEs included in the set of PPDEs with sparsely populated values within the relevant set of records may be removed from the set of PPDEs at block 410. The remaining DEs included in the pruned set of PPDEs are treated as attributes of the records in the relevant set of records that may be predictive of outcomes associated with the DEOI.

At block 412, a PM type may be determined or selected based on the pruned set of PPDEs and the relevant set of records. PM type generator 262 of FIG. 2A may determine or select the type of PM to train and validate based on the pruned set of PPDEs and relevant set of records. PM type generator 262 may analyze the pruned set of PPDEs to determine the type of PM that is most advantageous for predicting outcomes of the DEOI based on the PPDE and the records included in the relevant set of records. PM type generator 262 may employ various heuristics to determine the PM type. The selected PM type may include, but is not otherwise limited to, linear regression models, logistic regression models (e.g., classifiers), (directed or undirected) graph models, clustering models, Bayesian networks, decision tree models, support vector machine models, mixture models, expectation maximization (EM) models, Markov models, Monte Carlo models, reinforcement learning models, and the like.

Additionally at block 412, an implementation for the PM type may be determined and/or selected. The determined PM implementation may be based on the PM type. A PM implementation may include, but is not otherwise limited to, a neural network, such as but not limited to a feed forward neural network, a recurrent neural network (RNN), a long/short term memory (LSTM) neural network, a convolutional network, a deconvolutional network, and the like. Any implemented neural network may be a deep or shallow network. In at least some embodiments, the user may select the PM type and/or the PM implementation.

At block 414, the PM is generated based on the PM type, PM implementation, pruned set of PPDEs, set of relevant records, DEOI, and representative values of the DEOI. Various embodiments for generating a PM are discussed in conjunction with process 500 of FIG. 5. However, briefly here, a PM of the PM type and implemented via the PM implementation is trained and validated to predict outcomes of the DEOI. In the embodiments, the set of PPDEs may be transformed to determine candidate feature PPDEs. The significance (or correlation) of each candidate PPDE to the DEOI is determined A set of significantly predictive DEs (SPDEs) is generate based on pruning the candidate feature PPDEs that are either too highly significant or not significant enough.

Figure 5:
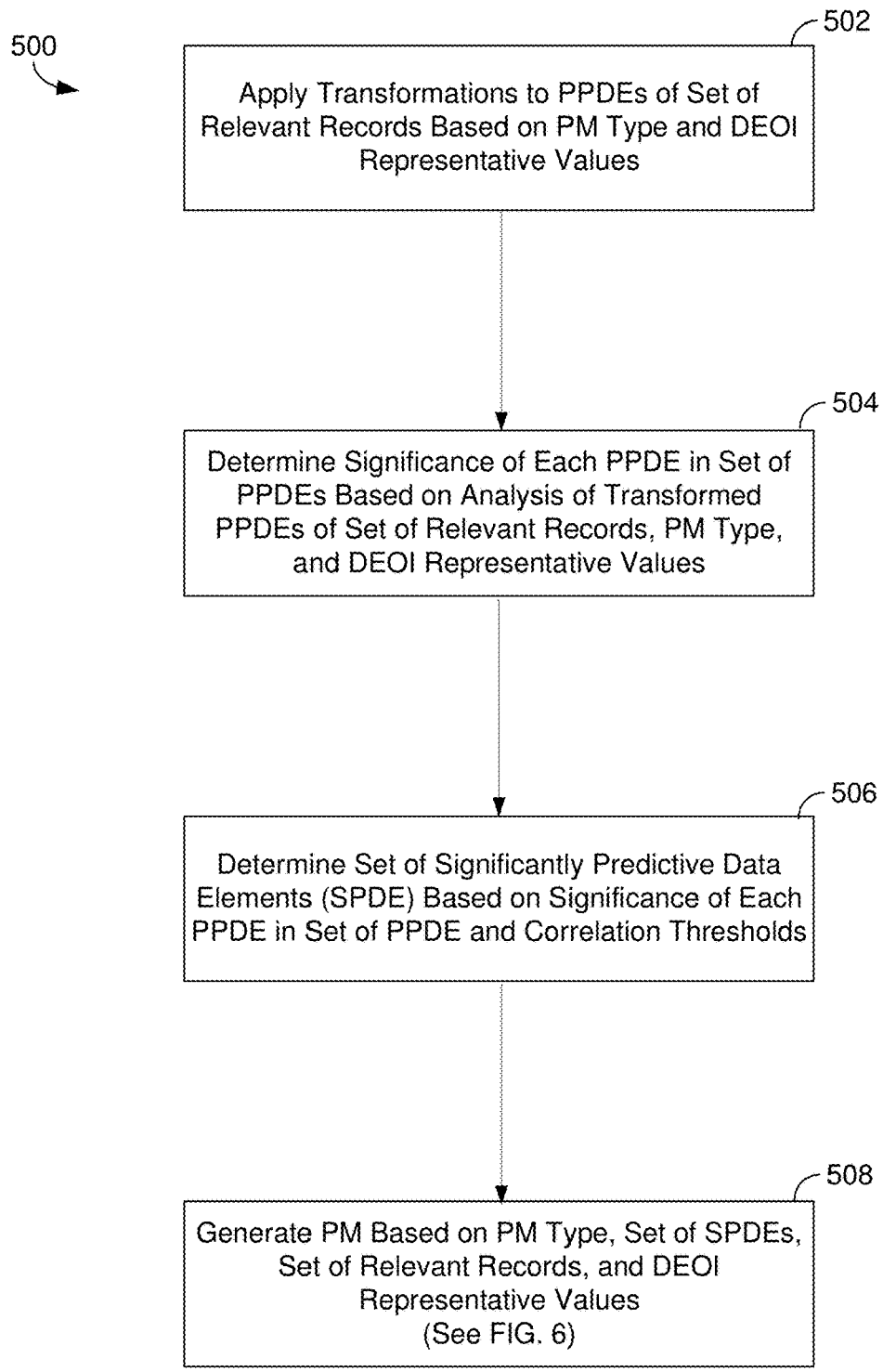
FIG. 5 provides a flow diagram that illustrates a method for determining significantly predictive data elements for generating a predictive model in accordance with an embodiment of the present disclosure.

Turning now to FIG. 5, a flow diagram is provided that illustrates a process 500 for determining significantly predictive data elements for generating a PM in accordance with an embodiment of the present disclosure. At least portions of process 500 may be enabled by, performed by, and/or carried out by devices and/or components included in operating environment 100 of FIG. 1 and/or PM system 200 of FIG. 2A.

Process 500 begins at block 502, where a transformation is applied to the values of the PPDEs of the records included in the relevant set of records. That is, the set of PPDEs are transformed into candidate feature PPDEs. A DE transformer, such as but not limited to DE transformer 296 of DE analyzer 290, may apply a transformation to the values of the PPDEs of records. Such transformations may include representing string values as numerical values, e.g., categorical representation of strings. For example, different string values representing similar DEs may be transformed into a unique single numerical value. Various clustering analyses may be performed on the values of the PPDEs. The string value for each PPDE included in a particular cluster is transformed into a particular numerical value, such that the transformed values of the PPDEs included in a cluster are all the same value, e.g., an index value. Thus, DE transformer 296 at block 502 may perform a dynamic indexing of the values of the PPDEs. The transformed values may include vector values. Thus, DE transformer 296 may perform various vector embeddings of the transformed values of the PPDEs. The transformed relevant set of records may include any transformations that share a general or a particular relationship with the DEOI. Such transformations may reduce a record to a transformed vector encodings. The transformations may reduce and/or collapse multiple nodes and/or corresponding records of the relevant set of records that share a relationship with a DEOI into a single vector representation.

In some embodiments, the PPDEs values from the relevant set of records are transformed into interim candidate feature PPDEs. The interim candidate feature PPDEs may be employed in PMs, such as transformation of string DEs into categorical DEs, transformation of numeric DEs into range DEs, transformation of date-time DEs into possible day-of-week, date, month, year, hour DEs, and the like.

At block 504, the significance of each transformed PPDE value in the set of PPDEs is determined. The significance of a PPDE may be with respect to the correlation with predicting a value of the DEOI. A DE significant tester, such as but not limited to DE significance tester 298, may be employed to determine a statistical significance of each of the PPDEs based on a statistical analysis of the transformed values, the PM type and implementation, the DEOI and its representative values, and the like. That is, a significance test for the correlation of the values of a PPDE with the values of the DEOI is performed. In various embodiments, an area under the curve (AUC) significance test may be applied to the values of the PPDEs. For example, in embodiments where the DEOI can be transformed into a classification value (such as a numerical value that indicates a binary classification of the DEOI), a receiving operating characteristic (ROC) curve may be generated for each of the PPDEs. The significance of each of the PPDEs may be determined and/or generated via a weak AUC test for the ROC curves. The significance of a PPDE may indicate the significance of the correlation with values of the DEOI. For example, the significance of a PPDE may be a significance metric that indicates a false positive and/or a false negative predictive result in a binary classification of the DEOI.

At block 506, a set of significantly predictive DEs (SPDEs) is determined based on the significance of the PPDEs in the set of PPDEs. PPDEs with either too high or too low correlations with the DEOI are removed or pruned from the set of PPDEs. The PPDEs that remain may be significantly predictive of an outcome or value of the DEOI. For example, the PPDEs with low correlation with the binary classification of the DEOI may be removed or pruned from the set of PPDEs. Similarly, for PPDEs where the correlation with the classification of the DEOI is too high, such "leaky" PPDEs may be removed and/or pruned from the set of PPDEs. Thus, DE significance tester 298 may employ upper and lower correlation (or significance) thresholds to remove PPDEs and generate the set of SPDEs. DE set generator 292 may generate the set of SPDEs based on the pruning of the too high/low correlating PPDEs from the set of PPDEs.

At block 508, the PM is generated based on the PM type, the set of SPDEs, the set of relevance records, the DEOI, and its representative values. Various embodiments for generating PM are discussed in conjunction with FIG. 6. However, briefly here, the SPDEs of the relevant records are featurized and the featurized relevant records are subdivided into a training data set and a validation data set. The training data set is employed to train the PM model and the validation data set is employed to validate the PM. In various embodiments, the PM is trained and validated employing various values of hyper-parameters. The choice of hyper-parameter values which generates the more accurate PM (as indicated via the validation of the PM) is chosen and deployed.

Figure 6:
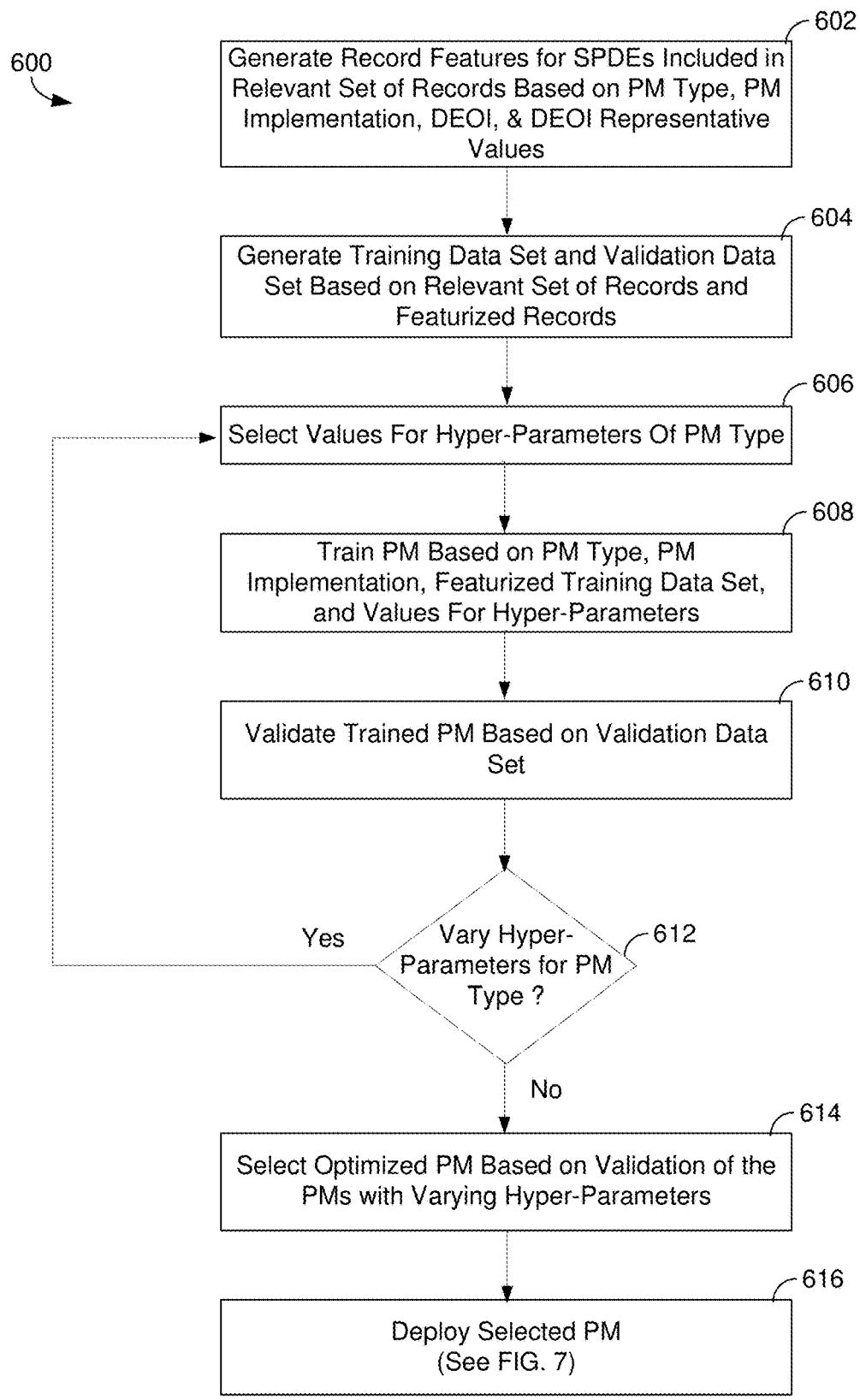
FIG. 6 provides a flow diagram that illustrates a method for training and deploying a predictive model in accordance with an embodiment of the present disclosure.

Turning now to FIG. 6, a flow diagram is provided that illustrates a process 600 for training and deploying a PM in accordance with an embodiment of the present disclosure. At least portions of process 600 may be enabled by, performed by, and/or carried out by devices and/or components included in operating environment 100 of FIG. 1 and/or PM system 200 of FIG. 2A.

Process 600 begins at block 602, where a record feature is generated for each of the SPDEs included in a set of SPDEs for the records included in the relevant set of records. That is, the SPDEs included in the records of the relevant set of records are featurized at block 602. Featurizing the SPDEs may include embedding the SPDEs within a multi-dimensional vector. In various embodiments, the SPDEs may be encoded as multi-dimensional vectors based on the PM type and the PM implementation. In various embodiments, record feature generator 286 transforms the values of the SPDEs in the records into a feature, such as but not limited to a latent or a hidden feature. Record embedder/indexer 288 may embed the featurized SPDEs in a vector space. That is, record embedder/indexer 288 may encode the SPDEs as a vector in a multi-dimensional space.

At block 604, a training data set is generated and a validation data set is generated from the relevant set of records that includes the featurized SPDEs. In various embodiments, the relevant set of records is subdivided into training records and validating records to generate the training and validation data sets respectively. In various embodiments, the training/validation record subdivider 264 of FIG. 2A subdibivies or splits the featurized relevant set of records. The subdivision may be a randomized process, where X % of the records are randomly assigned as testing records and Y % of the records are randomly assigned as validation records, where X+Y=100%. In some embodiments, X=80 and Y=20. In another embodiment, X=90 and Y=10. Any other such value for X and Y may be used in the embodiments.

At block 606, values for a hyper-parameter of the PM model is selected. Advantageously, and as shown in the loop between block 606-612, values for the hyper-parameters are varied. For each set of values, the PM is trained and validated. The set of hyper-parameter values that generates the most accurate PM, as indicated via the validation of the PM (see block 610) is selected for deploying. The values of the hyper-parameters may be selected systematically. For instance, when the PM includes more than one hyper-parameter, each hyper-parameter may be varied individually via nested loops. The range, step size (or binning), and variance for each hyper-parameter may be chosen appropriately. That is, the loop shown via block 606-612 may include any number of nested loops (dependent on the number of hyper-parameters of the PM type). Each loop may be iterated over any number of times, depending on the step size and range chosen for each hyper-parameter. In some embodiments, the range and step size are predetermined. In other embodiments, the user may provide user selections for the range and step size for each hyper-parameter.

At block 608, the PM is trained based on the PM type and implementation, as well as the featurized training data set and the selected values for the hyper-parameters. More specifically, the PM training engine 266 may be employed to train the PM. PM training engine 266 may employ various machine learning (ML) techniques based on the PM type and PM implementation. For example, various supervised (e.g., multilayer perception, i.e., neural networks) or unsupervised (e.g., mixture models) ML techniques may be employed. In one non-limiting embodiment, when the PM is a classifier model (implemented via regression), various supervised learning techniques that employ the training data set may be used. The DEOIs within the relevant set of records may serve as labeled training data, where the representative values of the DEOI are employed to determine classification labels. In other embodiments, an unsupervised clustering learning technique may be employed. In some embodiments, when a neural network is employed to implement the PM, backpropagation may be employed to generate the model's weights or other parameters.

At block 610, the validation data set is employed to validate the trained PM. PM validation engine 268 may validate the trained PM. The PM is validated for the hyper-parameter values selected at block 606. The validation may generate an accuracy metric for the selected hyper-parameters. At decision block 612, it is determined whether to further vary and/or select additional values for the hyper-parameters. If additional models are to be trained and validated with other hyper-parameter values, process 600 returns to block 606, to select additional hyper-parameter values. Otherwise, process 600 flows to block 614.

At block 614, the optimized PM is selected based on the validation of the PM with varying values for the hyper-parameters. That is, the most accurate PM is selected via the accuracy metrics generated at block 610. In some embodiments, the user is provided the option for selecting which of the PMs to select. At block 616, the optimized PM is deployed. Various embodiments for deploying a PM are discussed in conjunction with process 700 of FIG. 7. However, briefly here, the selected PM is employed to predict outcomes for the DEOI based on input data or records.

Figure 7:
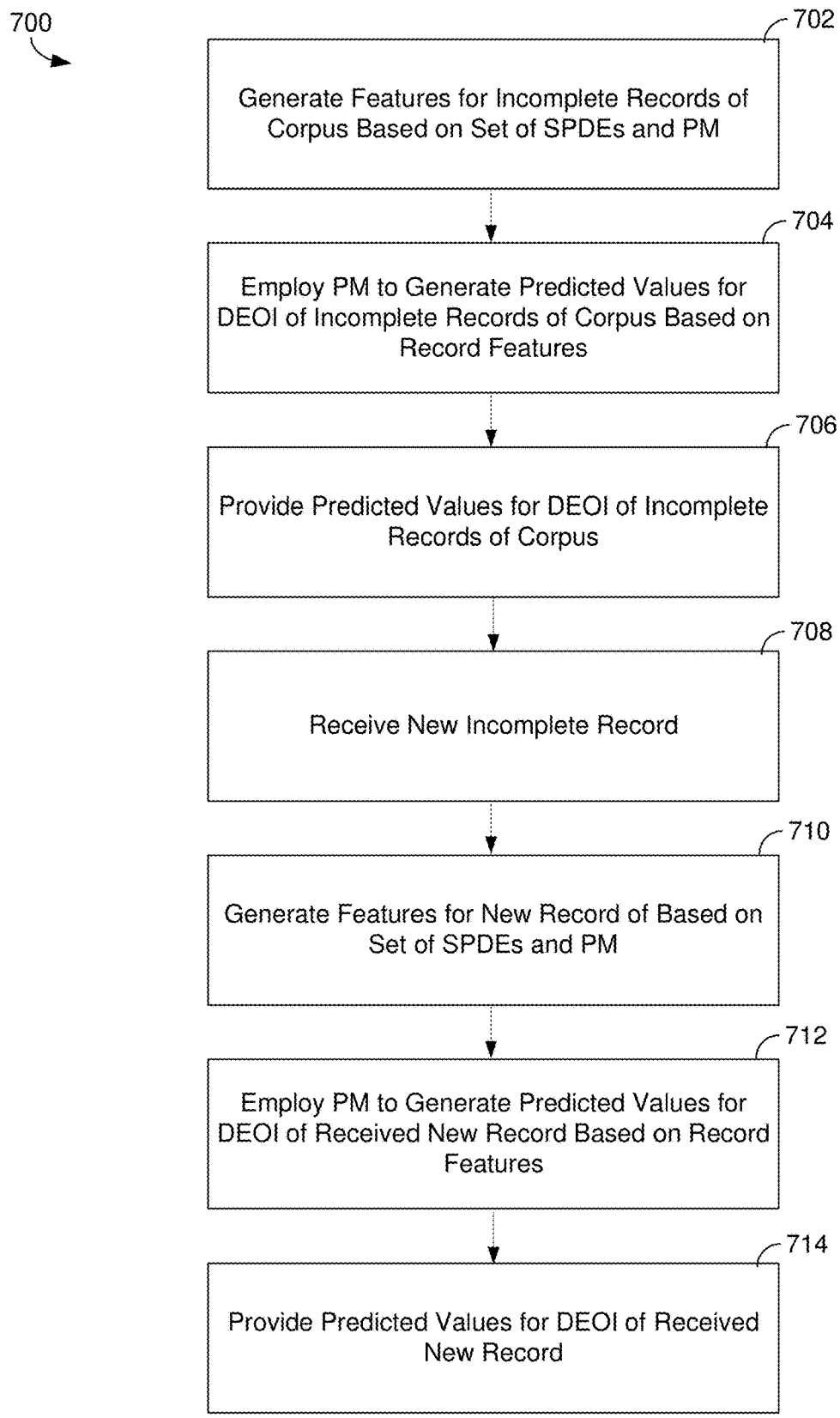
FIG. 7 provides a flow diagram that illustrates a method for deploying a trained and validated PM in accordance with an embodiment of the present disclosure.

Turning now to FIG. 7, a flow diagram is provided that illustrates a process 700 for deploying a trained and validated PM in accordance with an embodiment of the present disclosure. At least portions of process 700 may be enabled by, performed by, and/or carried out by devices and/or components included in operating environment 100 of FIG. 1 and/or PM system 200 of FIG. 2A.

Process 700 begins at block 702, where features for incomplete records within the corpus are generated based on the SPDEs and the trained PM. That is, the values of the SPDEs for records within the corpus are featurized, as discussed throughout. A DE analyzer, such as DE analyzer 290, may featurize the incomplete records of the corpus. Incomplete records may include any record in the corpus that does not have a value for the DEOI, or is directly or indirectly related to such a record.

At block 704, the trained and validated PM is employed to predict outcome and/or values, including confidence values, for the DEOI for incomplete records of the corpus. For example, the PM engine 284 may employ the PM to determine predicted values and confidence levels for the DEOI of the incomplete records. At block 706, the predicted values and confidence levels may be provided to a user.

At block 708, an new incomplete record is received. An incomplete record may be any record that does not include a value for the DEOI. Record receiver 282 may receive the new records. At block 710, features for the new records are generated. Generated features at block 710 may include similar processes as discussed in conjunction with blocks 602 and/or 702. At block 712, the PM is employed to generate a value for the DEOI based on the input records. PM engine 284 may be employed to determine the values for the DEOI. At block 714, the predicted values for the DEOI are provided to a user.

Accordingly, we have described various aspects of technology that provide an enhanced pipeline for the generation, validation, and deployment of machine-based enhanced predictive models. It is understood that various features, sub-combinations, and modifications of the embodiments described herein are of utility and may be employed in other embodiments without reference to other features or sub-combinations. Moreover, the order and sequences of steps shown in the example processes 300, 400, 500, 600, and 700 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 8A:
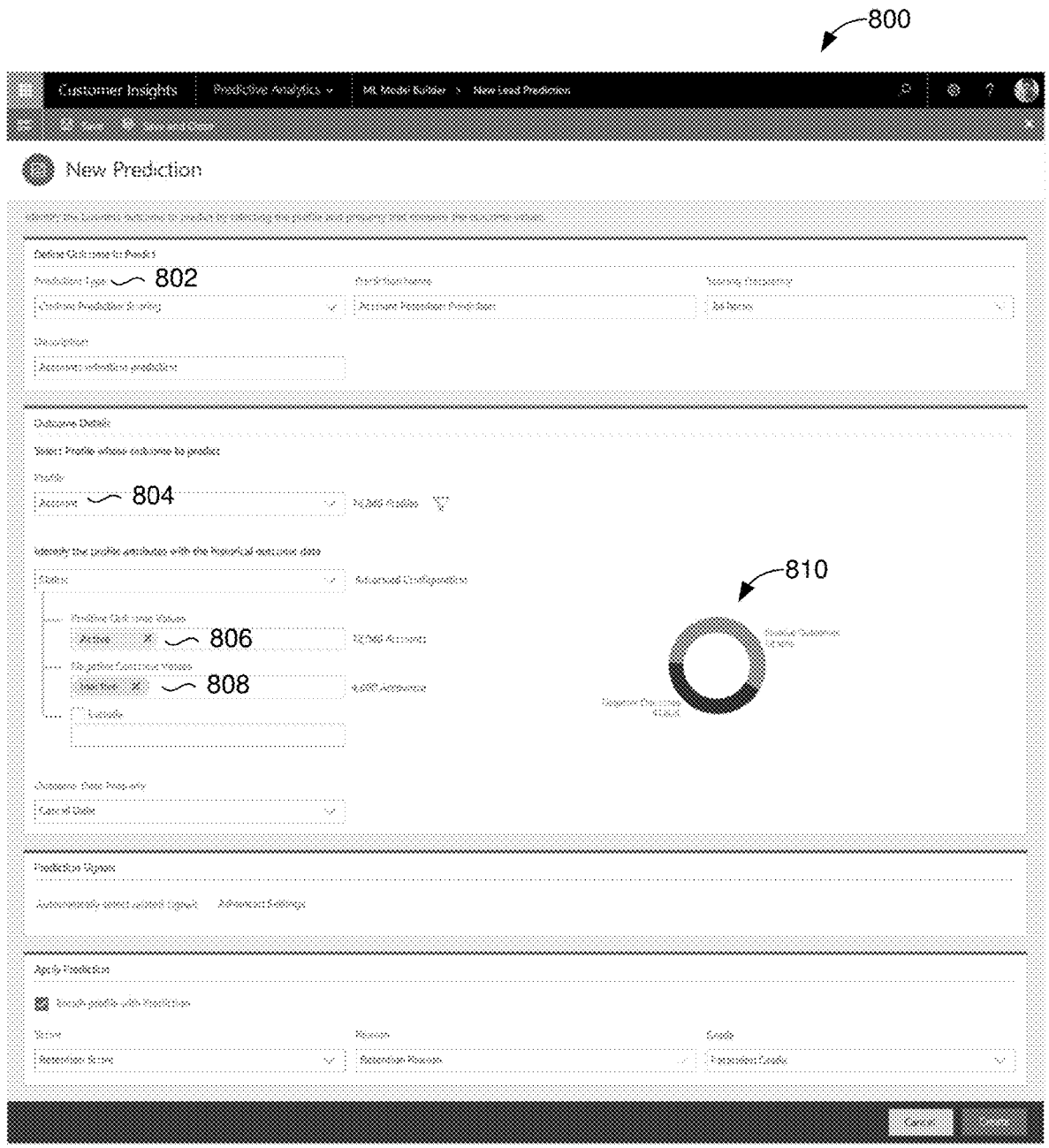
FIGS. 8A-8C illustrate an enhanced user interface that enable user interaction with the enhanced pipeline in accordance with an embodiment of the present disclosure.
Figure 8B:
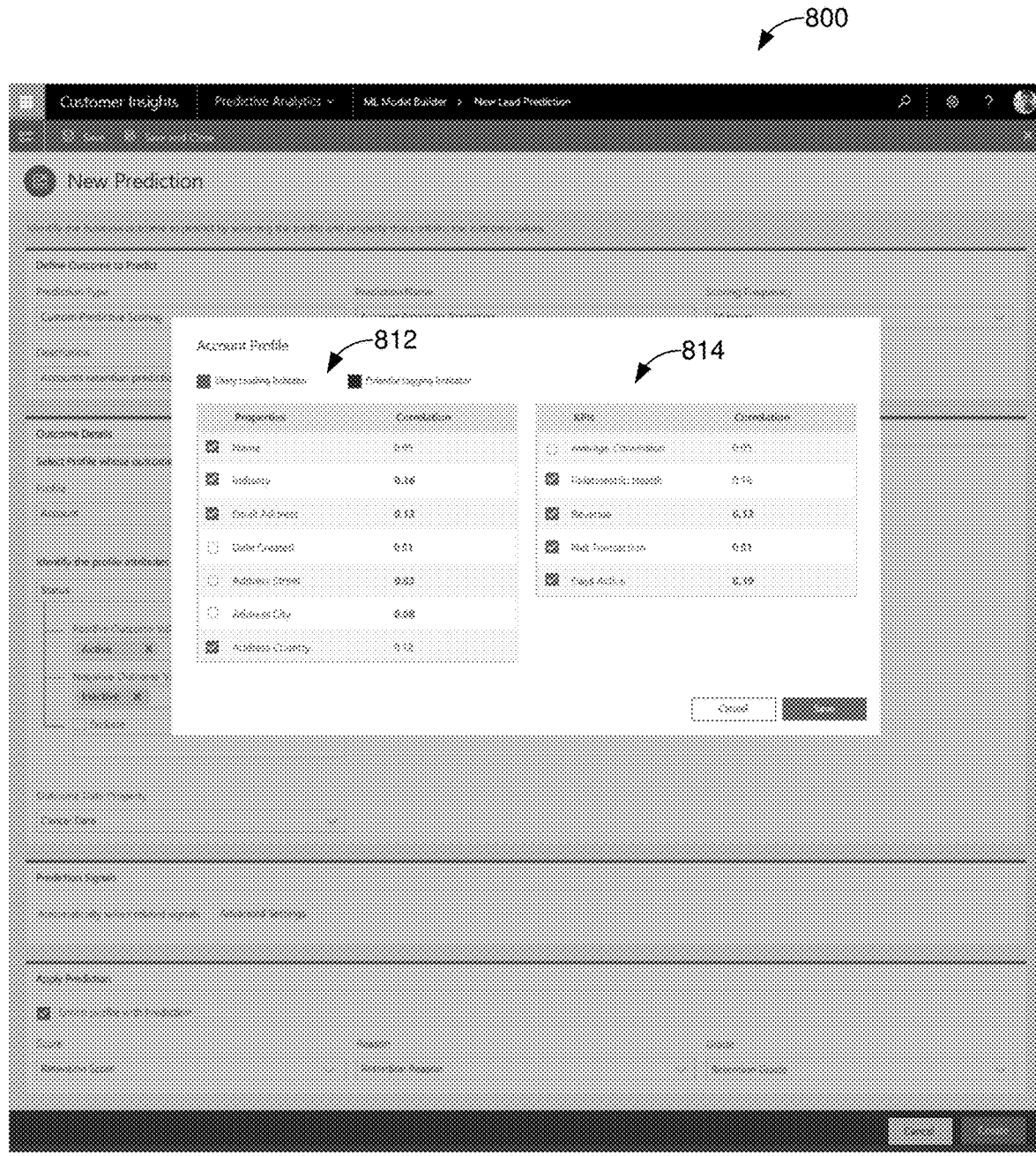
Figure 8C:

FIGS. 8A-8C illustrate an enhanced user interface (UI) that enable user interaction with the enhanced pipeline in accordance with an embodiment of the present disclosure. In FIG. 8A, UI 800 includes an option 802 for the user to select the prediction type. In some embodiments, the prediction type is the PM type and/or PM implementation to employ. In FIG. 8A, a binary classification PM type is selected. UI 800 includes another option 804 for the user to select the DEOI. In FIG. 8A, the selected DEOI is set to Account. UI 800 also enables the user to select two representative values for the DEOI: a positive outcome value 806 set to Account=Active and a negative outcome value 808 set to Account=Inactive. UI 800 also includes a graphical indication 810 that shows the absolute and relative number of records within the corpus that include DEOI values set to the positive 806 and negative 808 values.

Turning now to FIG. 8B, UI 800 has been updated to show various DEs 812 that are potentially predictive DEs of the DEOI, as well as the significance (i.e., correlation) with the DEOI. Note that PPDEs that are positively correlated with the DEOI (positive significance) are potential leading indicators of the DEOI, while those PPDEs that are negatively correlated with the DEOI (negative significance) are potential lagging indicators. UI 800 also shows various key performance indicators (KPIs) 814 of the PM, as well as the corresponding correlations with the DEOI.

Turning now to FIG. 8C, UI 800 has been updated to provide various results of the trained and validated binary classification PM. More particularly, updated UI 800 shows the performance of the binary classification of the PM. The PM has a prediction accuracy 828 of 0.8. The number of predictive signals 830 (i.e., significantly predictive DEs) within the relevant records is 9. Plots 820 show the distributions of the positive outcome classifications 824 and the negative outcome classifications 822 of the PM deployed on the relevant set of records. The x-axis of plots 820 represents a classification score. That is, the 9 significantly predictive signals 830 of the relevant records are combined to generate a classification score. The y-axis of plots 820 represents the number of records that include signals combined to generate the corresponding classification score The trained PM includes a discriminator value 826 of 68. That is, the PM classifies records with a classification score less than 68 as a record with a predicted negative outcome for the DEOI (Account=Inactive). The PM classifies records with a classification score greater than 68 as a record with a predicted positive outcome for the DEOI (Account=Active). Positive outcome classification 824 and negative out classification 826 shows the performance of the PM. Note that the vertical bar 826 indicates the discriminator value 826 of 68. As shown in plots 820, the trained PM misclassifies (false positives and false negatives) some records of the relevant set of records and properly classifies (true positives and true negatives) other records of the relevant set of records. Metrics 832 provides the absolute and relative true/false positive/negative predicted outcomes for records classified as negative outcomes. Similarly, metric 834 provides the absolute and relative true/false positive/negative predicted outcomes for records classified as positive outcomes.

Figure 9:
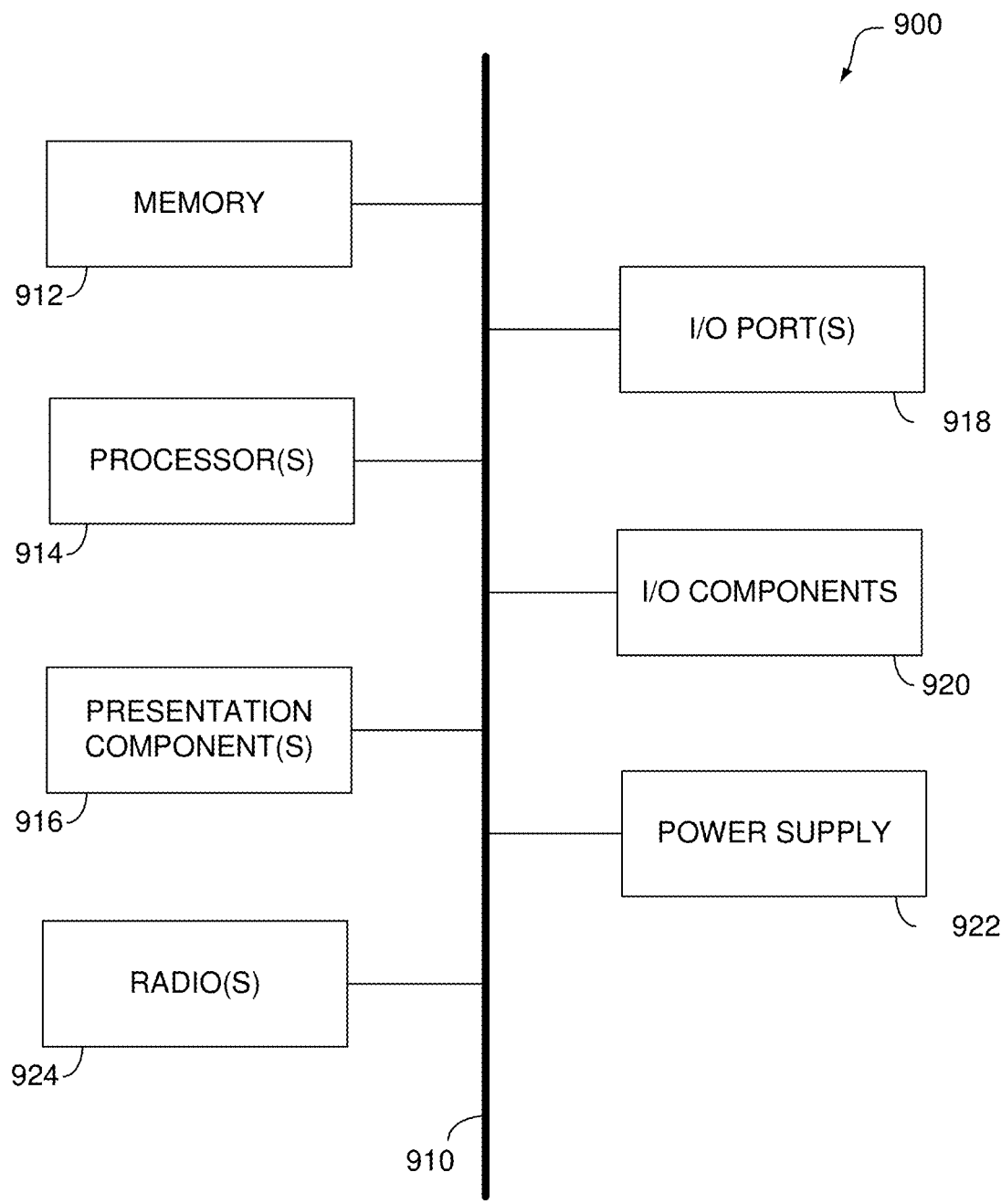
FIG. 9 is a block diagram of an exemplary computing environment suitable for use in implementing an embodiment of the present disclosure.

Having described various implementations, an exemplary computing environment suitable for implementing embodiments of the disclosure is now described. With reference to FIG. 9, an exemplary computing device is provided and referred to generally as computing device 900. The computing device 900 is but one example of a suitable computing environment and is not intended to suggest any limitation as to the scope of use or functionality of embodiments of the disclosure. Neither should the computing device 900 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. In some implementations, presentation component 220 of system 200 may be embodied as a presentation component 916. Other examples of presentation components may include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system comprising:
a processor; and
computer storage memory having computer-executable instructions stored thereon which, when executed by the processor, implement a method comprising:
receiving a corpus that includes a plurality of records, a first record of the plurality of records encoding a value for a data element (DE) of a plurality of DEs encoded in the plurality of records;
determining, based on a structure associated with the plurality of records, a first relationship of a plurality of relationships records of the plurality of records, the first relationship of the plurality of relationships being indicative of a level of statistical confidence of the first relationship between the first record and a second record;
receiving a user selection that indicates the DE is a DE of interest (DEOI) of the plurality of DEs;
receiving an additional user selection that indicates a first value and a second value associated with the DEOI, where the first value and the second value include representative values of the DEOI useable to determine classification labels during training of a predictive model (PM);
determining a relevant set of records of the plurality of records based on the plurality of relationships and the DEOI, each record included in the relevant set of records including the DEOI or is related to another record of the relevant set of records that includes the DEOI via the plurality of relationships;
training the PM based on the set of relevant records, the DEOI, the first value of the DEOI, and the second value of the DEOI, the trained PM is trained, based on input records that do not include the first value and the second value of the DEOI and based on the additional user selection that indicates the first value and the second value of the DEOI, to predict at least one value for the DEOI of an incomplete record that does not include the first and second value of the DEOI; and
providing the trained PM to a user.

2. The system of claim 1, wherein the PM is a classifier machine learning (ML) model, the first value of the DEOI is classified as a first outcome associated with the DEOI, the second value of the DEOI is classified as a second outcome associated with the DEOI, and training the ML model includes supervised training based on a plurality of values for the DEOI included in the relevant set of records, the first outcome associated with the DEOI, and the second outcome associated with the DEOI.

3. The system of claim 1, wherein the method further comprises:
generating a graph that includes a plurality of nodes and a plurality of edges, each node of the plurality of nodes corresponding to a particular record of the plurality of records and each edge of the plurality of edges corresponds to a particular relationship of the plurality of relationships between records corresponding to connected nodes in the graph;

generating a connected subgraph of the graph based on the DEOI, each node of the subgraph corresponding to a record of the plurality of records that includes the DEOI or is directly or indirectly connected to another node of the plurality of nodes that corresponds to another record of the plurality of records that includes the DEOI via the plurality of edges; and traversing the subgraph to determine the relevant set of records, each record included in the relevant set of records corresponding to a node included in the subgraph.

4. The system of claim 1, wherein the method further comprises:

determining, based on the set of relevant records, a set of potentially predictive DEs (PPDEs), each PPDE in the set of PPDEs is included in at least a portion of the records of the relevant set; and pruning the set of PPDEs based on a DE density requirement.

5. The system of claim 1, wherein the method further comprises:

determining, based on the relevant set of records, a set of potentially predictive DEs (PPDEs), each PPDE in the set of PPDEs is included in at least a portion of the records of the relevant set;

determining a significance of each PPDE within the set of PPDEs, with respect to the DEOI;

pruning the set of PPDEs based on the significance of each PPDE included the set of PPDEs and a correlation threshold; and generating a set of significantly predictive DEs (SPDEs) based on the pruned set of PPDEs.

6. The system of claim 1, wherein the method further comprises:

training a plurality of PMs, each PM included in the plurality of PMs corresponding to a separate value for a hyper-parameter of a PM type;

validating each PM of the plurality of PMs;

determining an accuracy metric for each PM of the plurality of PMs, the accuracy metric for a particular PM of the plurality of PMs being based on validating the particular PM; and selecting an optimal PM of the plurality of PMs based on the accuracy metric for each PM of the plurality of PMs.

7. The system of claim 1, wherein the method further comprises:

featurizing the relevant set of records;

generating a training data set based on a portion of the featurized relevant set of records;

generating a validation data set based on another portion of the featurized relevant data set;

training the PM based on the training data set;

validating the trained PM based on the validation data set;

determining a key performance indicator (KPI) of the trained PM based on validating the trained PM; and providing the KPI to the user.

8. A method comprising:

receiving a corpus that includes a plurality of records, a first record of the plurality of records encoding a value for a data element (DE) of a plurality of DEs encoded in the plurality of records;

determining, based on a structure associated with the plurality of records, a first relationship of a plurality of relationships between the first record and at least one other record of the plurality of records, the first relationship of the plurality of relationships being indicative of a level of statistical confidence of the first relationship;

receiving, through a user interface displayed on a user device, a user selection that indicates a DE of interest (DEOI) of the plurality of DEs;

receiving, through the user interface, an additional user selection that indicates a first value and a second value of the DEOI, where the first value and the second value include representative values of the DEOI useable to determine classification labels during training of a predictive model (PM);

determining a relevant set of records of the plurality of records based on the plurality of relationships and the DEOI, each record included in the relevant set of records including the DEOI or is related to another record of the relevant set of records that includes the DEOI via the plurality of relationships;

training the PM based on the set of relevant records, the DEOI, the first value of the DEOI, and the second value of the DEOI, the trained PM is trained, based on input records that do not include the first value and the second value of the DEOI and based on the additional user selection that indicates the first value and the second value of the DEOI, to predict at least one value for the DEOI of an incomplete record that does not include the first and second value of the DEOI; and providing the trained PM to a user.

9. The method of claim 8, wherein the PM is a classifier machine learning (ML) model, the first value of the DEOI is classified as a first outcome associated with the DEOI, the second value of the DEOI is classified as a second outcome associated with the DEOI, and training the ML model includes supervised training based on a plurality of values for the DEOI included in the relevant set of records, the first outcome associated with the DEOI, and the second outcome associated with the DEOI.

10. The method of claim 8, further comprising:

generating a graph that includes a plurality of nodes and a plurality of edges, each node of the plurality of nodes corresponding to a particular record of the plurality of records and each edge of the plurality of edges corresponds to a particular relationship of the plurality of relationships between records corresponding to connected nodes in the graph;

generating a connected subgraph of the graph based on the DEOI, each node of the subgraph corresponding to a record of the plurality of records that includes the DEOI or is directly or indirectly connected to another node of the plurality of nodes that corresponds to another record of the plurality of records that includes the DEOI via the plurality of edges; and traversing the subgraph to determine the relevant set of records, each record included in the relevant set of records corresponding to a node included in the subgraph.

11. The method of claim 8, further comprising:

determining, based on the relevant set of records, a set of potentially predictive DEs (PPDEs), each PPDE in the set of PPDEs is included in at least a portion of the records of the relevant set; and pruning the set of PPDEs based on a DE density requirement.

12. The method of claim 8, further comprising:
- determining, based on the relevant set of records, a set of potentially predictive DEs (PPDEs), each PPDE in the set of PPDEs is included in at least a portion of the records of the relevant set;
- determining a significance of each PPDE within the set of PPDEs, with respect to the DEOI;
- pruning the set of PPDEs based on the significance of each PPDE included in the set of PPDEs and a correlation threshold; and
- generating a set of significantly predictive DEs (SPDEs) based on the pruned set of PPDEs.

13. The method of claim 8, further comprising:
- training a plurality of PMs, each PM included in the plurality of PMs corresponding to a separate value for a hyper-parameter of a PM type;
- validating each PM of the plurality of PMs;
- determining an accuracy metric for each PM of the plurality of PMs, the accuracy metric for a particular PM of the plurality of PMs being based on validating the particular PM; and
- selecting an optimal PM of the plurality of PMs based on the accuracy metric for each PM of the plurality of PMs.

14. The method of claim 8, further comprising:
- featurizing the relevant set of records;
- generating a training data set based on a portion of the featurized relevant set of records;
- generating a validation data set based on another portion of the featurized relevant data set;
- training the PM based on the training data set;
- validated the trained PM based on the validation data set;
- determining a key performance indicator (KPI) of the trained PM based on validating the trained PM; and
- providing the KPI to the user.

15. A non-transitory computer-readable media having instructions stored thereon, wherein the instructions, when executed by a processor of a computing device, cause the computing device to perform actions including:
- receiving a corpus that includes a plurality of records, a first record of the plurality of records encoding a value for a data elements (DE) of a plurality of DEs encoded in the plurality of records;
- determining, based on a structure of the plurality of records, a first relationship between individual the first record and a second record of the plurality of records, the first relationship indicative of a level of statistical confidence of the first relationship;
- receiving, through a user interface displayed on a user device, a user selection that indicates a DE of interest (DEOI) of the plurality of DEs;
- receiving, through the user interface displayed on a user device, an additional user selection that indicates a first value and a second value of the DEOI, where the first value and the second value include representative values if the DEOI useable to determine classification labels during training of a predictive model (PM);
- determining a relevant set of records of the plurality of records based on the plurality of relationships and the DEOI, each record included in the relevant set of records including the DEOI or is related to another record of the relevant set of records that includes the DEOI via the plurality of relationships;
- training the PM based on the set of relevant records, the DEOI, the first value of the DEOI, and the second value of the DEOI, the trained PM is trained, based on input records that do not include the first value and the second value of the DEOI and based on the additional user selection that indicates the first value and the second value of the DEOI, to predict at least one value for the DEOI of an incomplete record that does not include the first and second value of the DEOI; and
- providing the trained PM to a user.

16. The computer-readable media of claim 15, wherein the PM is a classifier machine learning (ML) model, the first value of the DEOI is classified as a first outcome associated with the DEOI, the second value of the DEOI is classified as a second outcome associated with the DEOI, and training the ML model includes supervised training based on a plurality of values for the DEOI included in the relevant set of records, the first outcome associated with the DEOI, and the second outcome associated with the DEOI.

17. The computer-readable media of claim 15, the actions further comprising:
- generating a graph that includes a plurality of nodes and a plurality of edges, each node of the plurality of nodes corresponding to a particular record of the plurality of records and each edge of the plurality of edges corresponds to a particular relationship of the plurality of relationships between records corresponding to connected nodes in the graph;
- generating a connected subgraph of the graph based on the DEOI, each node of the subgraph corresponding to a record of the plurality of records that includes the DEOI or is directly or indirectly connected to another node of the plurality of nodes that corresponds to another record of the plurality of records that includes the DEOI via the plurality of edges; and
- traversing the subgraph to determine the relevant set of records, each record included in the relevant set of records corresponding to a node included in the subgraph.

18. The computer-readable media of claim 15, the actions further comprising:
- determining, based on the relevant set of records, a set of potentially predictive DEs (PPDEs), each PPDE in the set of PPDEs is included in at least a portion of the records of the relevant set; and
- pruning the set of PPDEs based on a DE density requirement.

19. The computer-readable media of claim 15, the actions further comprising:
- determining, based on the relevant set of records, a set of potentially predictive DEs (PPDEs), each PPDE in the set of PPDEs is included in at least a portion of the records of the relevant set;
- determining a significance of each PPDE within the set of PPDEs, with respect to the DEOI;
- pruning the set of PPDEs based on the significance of each PPDE included in the set of PPDEs and a correlation threshold; and
- generating a set of significantly predictive DEs (SPDEs) based on the pruned set of PPDEs.

20. The computer-readable media of claim 15, the actions further comprising:
- training a plurality of PMs, each PM included in the plurality of PMs corresponding to a separate value for a hyper-parameter of a PM type;
- validating each PM of the plurality of PMs;
- determining an accuracy metric for each PM of the plurality of PMs, the accuracy metric for a particular PM of the plurality of PMs being based on validating the particular PM; and selecting an optimal PM of the plurality of PMs based on the accuracy metric for each PM of the plurality of PMs.

\* \* \* \* \*